(12) United States Patent
Miyazaki et al.

(10) Patent No.: US 8,516,373 B2
(45) Date of Patent: Aug. 20, 2013

(54) AUDIO/VISUAL AMPLIFIER, SELECTION METHOD, PROGRAM, AND RECORDING MEDIUM

(75) Inventors: Reiko Miyazaki, Tokyo (JP); Kazuto Nishizawa, Kanagawa (JP); Taku Sugawara, Tokyo (JP)

(73) Assignee: Sony Corporation, Tokyo (JP)

( * ) Notice: Subject to any disclaimer, the term of this patent is extended or adjusted under 35 U.S.C. 154(b) by 1087 days.

(21) Appl. No.: 11/852,576

(22) Filed: Sep. 10, 2007

(65) Prior Publication Data

US 2008/0178085 A1 Jul. 24, 2008

(30) Foreign Application Priority Data

Sep. 13, 2006 (JP) .................................. 2006-248256

(51) Int. Cl.
*G06F 3/00* (2006.01)
(52) U.S. Cl.
USPC .......................................... 715/716; 715/810
(58) Field of Classification Search
USPC .................. 715/716, 727, 719, 728, 729, 810
See application file for complete search history.

(56) References Cited

U.S. PATENT DOCUMENTS

| | | | | |
|---|---|---|---|---|
| 5,528,304 | A | * | 6/1996 | Cherrick et al. ................. 725/41 |
| 5,917,557 | A | * | 6/1999 | Toyoda .......................... 348/705 |
| 6,122,018 | A | * | 9/2000 | Sugihara et al. .............. 348/705 |
| 7,086,081 | B2 | * | 8/2006 | Martinez et al. ............... 725/133 |
| 2002/0171624 | A1 | * | 11/2002 | Stecyk et al. .................. 345/156 |
| 2004/0194132 | A1 | * | 9/2004 | Kawashima et al. ........... 725/37 |
| 2004/0252237 | A1 | * | 12/2004 | Park et al. ...................... 348/552 |
| 2005/0289613 | A1 | | 12/2005 | Lawrence |
| 2006/0158838 | A1 | | 7/2006 | Kinoshita et al. |
| 2007/0058033 | A1 | * | 3/2007 | Tsai et al. ................... 348/14.05 |

FOREIGN PATENT DOCUMENTS

| | | |
|---|---|---|
| JP | 2005-251340 | 9/2005 |
| JP | 2006-86621 | 3/2006 |

OTHER PUBLICATIONS

U.S. Appl. No. 12/257,663, filed Oct. 24, 2008, Miyazaki et al.

* cited by examiner

*Primary Examiner* — Rashawn Tillery
(74) *Attorney, Agent, or Firm* — Oblon, Spivak, McClelland, Maier & Neustadt, L.L.P.

(57) ABSTRACT

An audio/visual amplifier for processing video signals and audio signals includes a display controller operable to control display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other; and a selector operable to, when the user selects the input name as the item of the menu, select the video signal received from the first terminal and the audio signal received from the second terminal.

8 Claims, 29 Drawing Sheets

FIG. 1

| Assign Category | Port | Connected Device |
|---|---|---|
| Digital Assign | VIDEO1 COAX<br>VIDEO1 OPT | VIDEO1, VIDEO2, VIDEO3, VIDEO4, TAPE, TUNER |
| | VIDEO5 OPT | VIDEO2, VIDEO3, VIDEO4, VIDEO5, TAPE, TUNER |
| | DVD OPT<br>DVD COAX | VIDEO2, VIDEO3, VIDEO4, DVD, TAPE, TUNER |
| | LD COAX<br>LD OPT | VIDEO2, VIDEO3, VIDEO4, LD, TAPE, TUNER |
| | TV/SAT COAX<br>TV/SAT OPT | VIDEO2, VIDEO3, VIDEO4, TV/SAT, TAPE, TUNER |
| | MD/DAT OPT | VIDEO2, VIDEO3, VIDEO4, MD/DAT, TAPE, TUNER |
| | SA-CD COAX<br>SA-CD OPT | VIDEO2, VIDEO3, VIDEO4, SA-CD, TAPE, TUNER |
| COMPONENT V. ASSIGN | DVD | NONE, VIDEO1, VIDEO2, VIDEO3, VIDEO4, VIDEO5, LD, DVD, TAPE, MD/DAT, SA-CD/CD, TUNER |
| | TV/SAT | NONE, VIDEO1, VIDEO2, VIDEO3, VIDEO4, VIDEO5, LD, DVD, TV/SAT, TAPE, MD/DAT, SA-CD/CD, TUNER |
| HDMI Assign | HDMI 1 | NONE, VIDEO1, VIDEO2, VIDEO3, VIDEO4, VIDEO5, LD, DVD, TAPE, MD/DAT, SA-CD/CD, TUNER |
| | HDMI 2 | NONE, VIDEO1, VIDEO2, VIDEO3, VIDEO4, VIDEO5, LD, DVD, TV/SAT, TAPE, MD/DAT, SA-CD/CD, TUNER |

FIG. 8

| Input Name | Video | Audio |
|---|---|---|
| Video3 | Video3: S | Video3: OPT |
| DVD | DVD: Component | DVD: COAX |
| TV/SAT | TV/SAT: Component | TV/SAT: OPT |
| Tape/CDR | | Tape/CDR: COAX |
| MD/DAT | | MD/DAT: OPT |

Input

FIG. 10
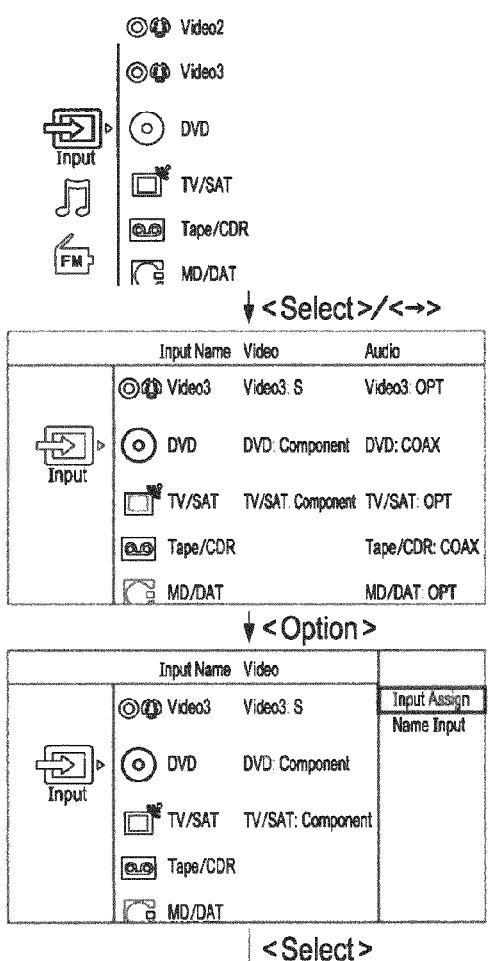
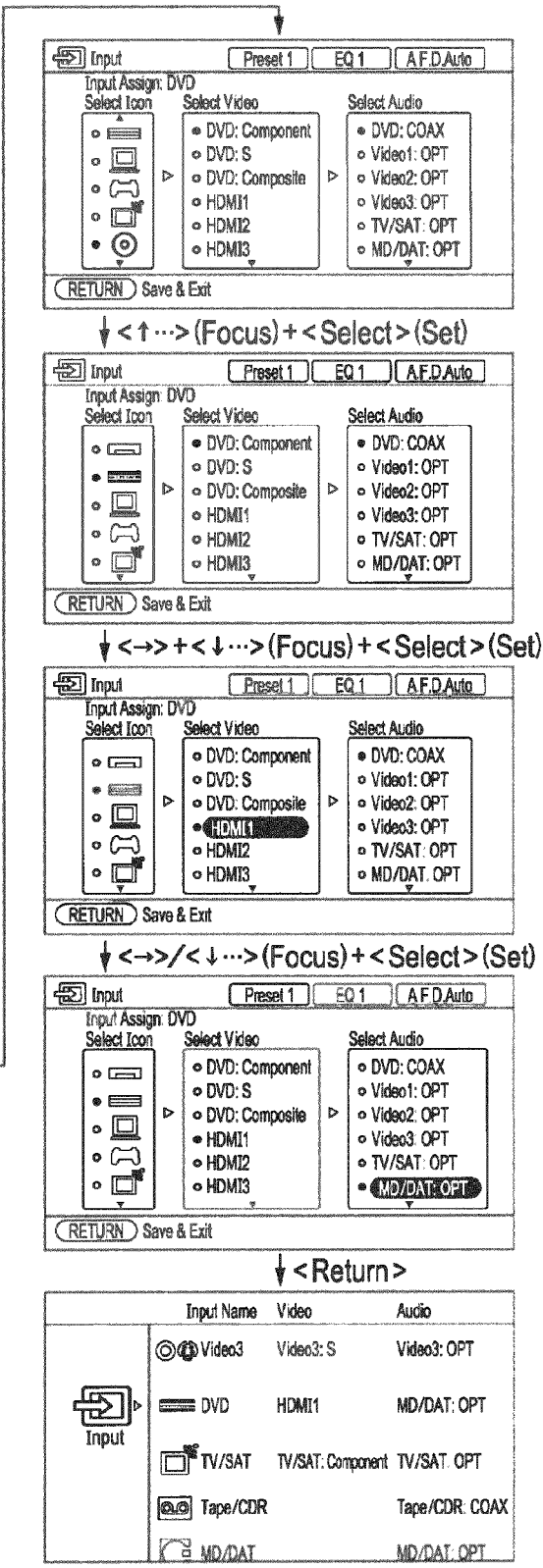

FIG. 19

| Input | Video In | Audio In |
|---|---|---|
| VIDEO 1 | VIDEO 1: V/S/C<br>DVD: C<br>TV/SAT: C | VIDEO 1: ANALOG/OPT/COAX |
| | HDMI 1/HDMI 2 | - |
| VIDEO 2 | VIDEO 2: V/S<br>DVD: C<br>TV/SAT: C | VIDEO 2: ANALOG<br>VIDEO 1: OPT/COAX<br>VIDEO 5: OPT<br>DVD: OPT/COAX<br>LD: OPT/COAX<br>TV/SAT: OPT/COAX<br>MD/DAT: OPT<br>CD/SA-CD: OPT/COAX |
| | HDMI 1/HDMI 2 | - |
| VIDEO 3 | VIDEO 3: V/S<br>DVD: C<br>TV/SAT: C | VIDEO 3: ANALOG<br>VIDEO 1: OPT/COAX<br>VIDEO 5: OPT<br>DVD: OPT/COAX<br>LD: OPT/COAX<br>TV/SAT: OPT/COAX<br>CD/SA-CD: OPT/COAX<br>MD/DAT: OPT |
| | HDMI 1/HDMI 2 | - |
| VIDEO 4 | VIDEO 4: V/S<br>DVD: C<br>TV/SAT: C | VIDEO 4: ANALOG<br>VIDEO 1: OPT/COAX<br>VIDEO 5: OPT<br>DVD: OPT/COAX<br>LD: OPT/COAX<br>TV/SAT: OPT/COAX<br>CD/SA-CD: OPT/COAX<br>MD/DAT: OPT |
| | HDMI 1/HDMI 2 | - |
| VIDEO 5 | VIDEO 5: V/S<br>DVD: C<br>TV/SAT: C | VIDEO 5: ANALOG/OPT |
| | HDMI 1/HDMI 2 | |
| DVD | DVD: V/S/C<br>TV/SAT: C | DVD: ANALOG/OPT/COAX |
| | HDMI 1/HDMI 2 | - |
| LD | LD: V/S<br>DVD: C<br>TV/SAT: C | LD: ANALOG/OPT |
| | HDMI 1/HDMI 2 | - |
| TV/SAT | TV/SAT: V/S/C | TV/SAT: ANALOG/OPT/COAX |
| | HDMI 2 | - |
| CD/SA-CD | DVD: C<br>TV/SAT: C | CD/SA-CD: ANALOG/OPT/COAX |
| | HDMI 1/HDMI 2 | - |
| MD/DAT | DVD: C<br>TV/SAT: C | MD/DAT: ANALOG/OPT |
| | HDMI 1/HDMI 2 | - |
| TAPE | DVD: C<br>TV/SAT: C | TAPE: ANALOG<br>VIDEO 1: OPT/COAX<br>VIDEO 5: OPT<br>DVD: OPT/COAX<br>LD: OPT/COAX<br>TV/SAT: OPT/COAX<br>CD/SA-CD: OPT/COAX<br>MD/DAT: OPT |
| | HDMI 1/HDMI 2 | - |
| TUNER | - | TUNER PACK (ANALOG)<br>VIDEO 1: OPT/COAX<br>VIDEO 5: OPT<br>DVD: OPT/COAX<br>LD: OPT/COAX<br>TV/SAT: OPT/COAX<br>CD/SA-CD: OPT/COAX<br>MD/DAT: OPT |

FIG. 20

| | VIDEO1 | VIDEO2 | VIDEO3 | DVD | TV/SAT | TAPE/CD-R | MD/DAT | SA-CD/CD |
|---|---|---|---|---|---|---|---|---|
| Assignable Video Input | | | | | | | | |
| Video1 Component | ○ | ○ | ○ | | | ○ | ○ | ○ |
| Video1 S | ○ | | | | | | | |
| Video1 Composite | ○ | | | | | | | |
| Video2 S | | ○ | | | | | | |
| Video2 Composite | | ○ | ○ | | | | | |
| Video3 S | | | ○ | | | | | |
| Video3 Composite | | | ○ | | | | | |
| DVD Component | | | | ○ | | | | |
| DVD S | | ○ | | ○ | | ○ | ○ | ○ |
| DVD Composite | | | ○ | ○ | | | | |
| TV/SAT Component | | | | | ○ | | | |
| TV/SAT S | | | | | ○ | | | |
| TV/SAT Composite | | | | | ○ | | | |
| HDMI 1 | ○ | ○ | ○ | ○ | ○ | ○ | ○ | ○ |
| HDMI 2 | ○ | ○ | ○ | ○ | ○ | ○ | ○ | ○ |
| HDMI 3 | ○ | ○ | ○ | ○ | ○ | ○ | ○ | ○ |
| Assignable Audio Input | | | | | | | | |
| Video1 OPT | ○ | | | | | ○ | ○ | ○ |
| Video2 OPT | | ○ | | | | ○ | ○ | ○ |
| Video3 OPT | | | ○ | | | ○ | ○ | ○ |
| TV/SAT OPT | | | | | ○ | ○ | ○ | ○ |
| MD/DAT OPT | | | | ○ | ○ | ○ | ○ | ○ |
| DVD COAX | ○ | ○ | ○ | | | ○ | | |
| TAPE/CD-R COAX | ○ | ○ | ○ | ○ | ○ | | ○ | |
| SA-CD/CD COAX | | | | | | | | ○ |

FIG. 21

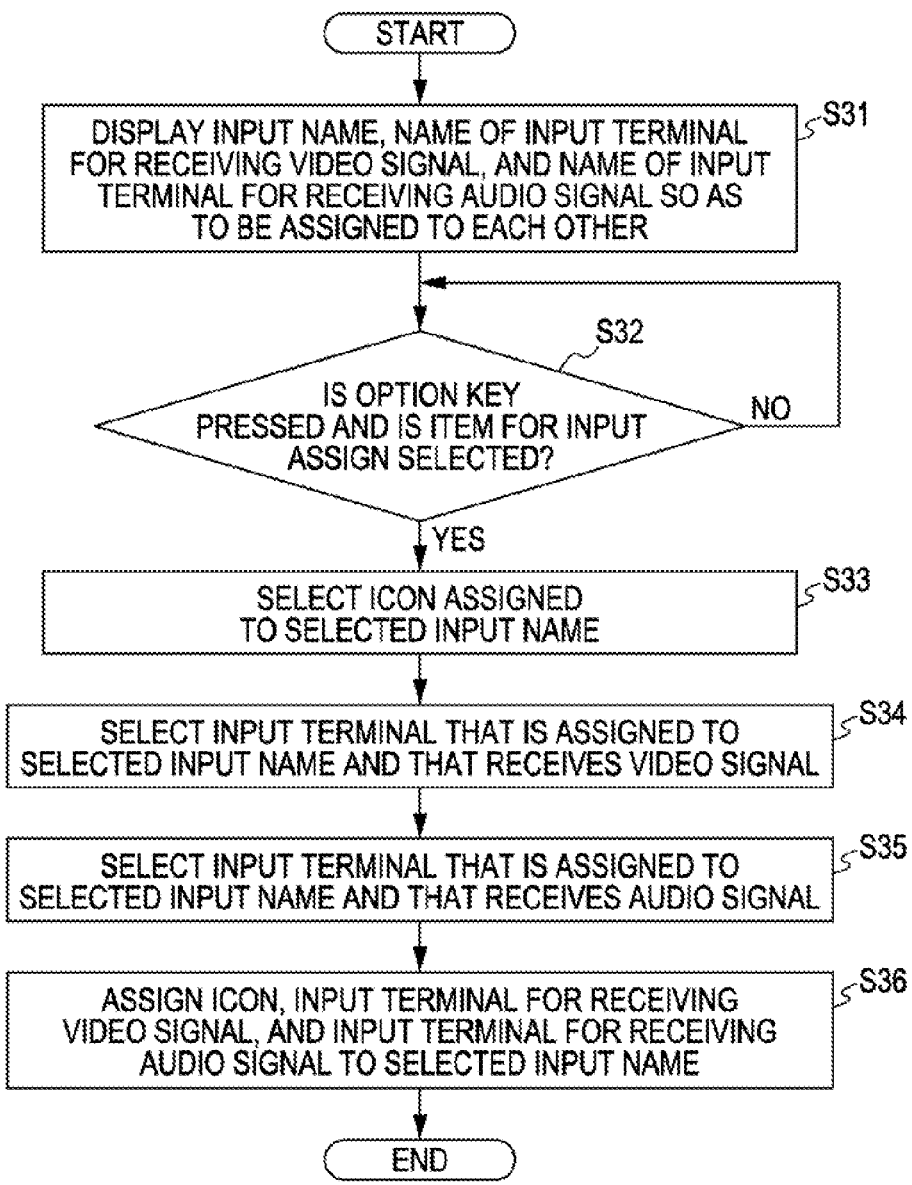

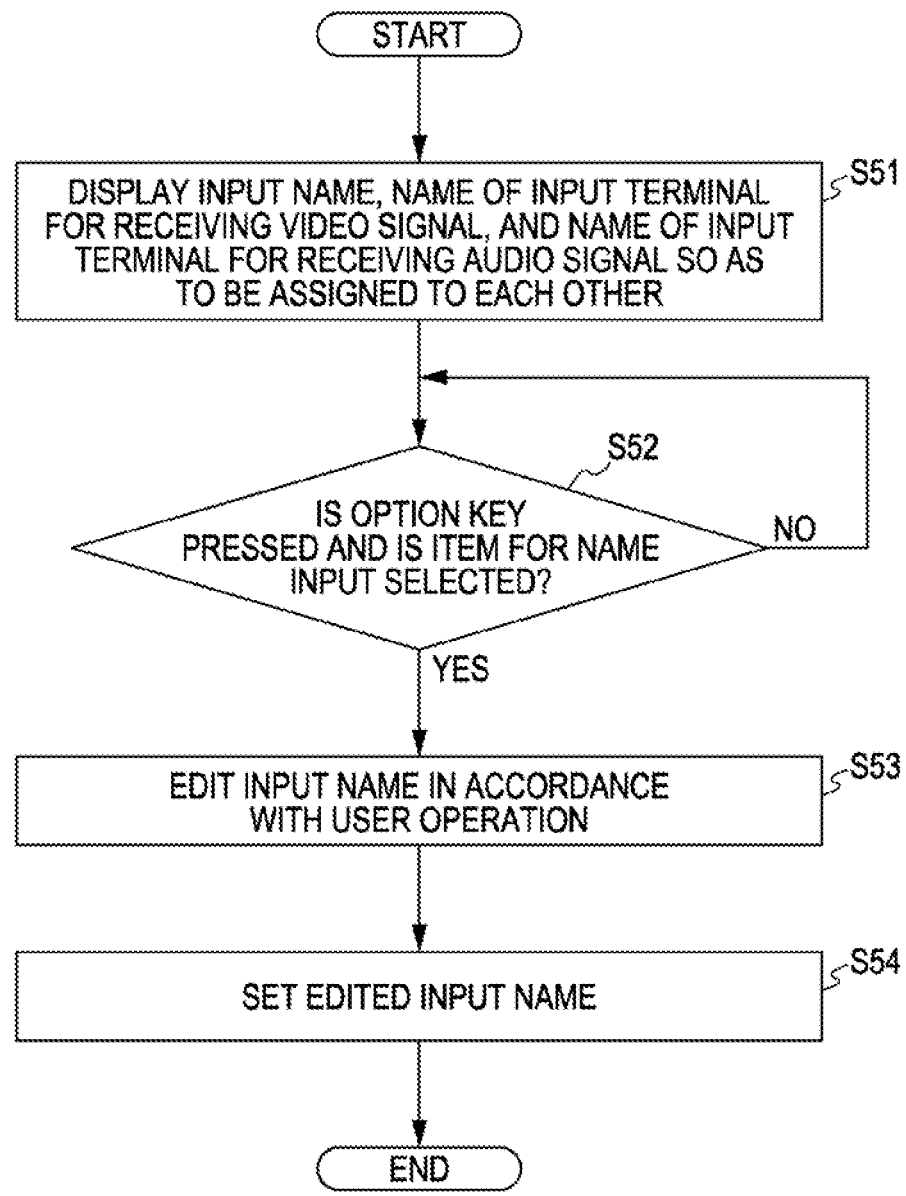

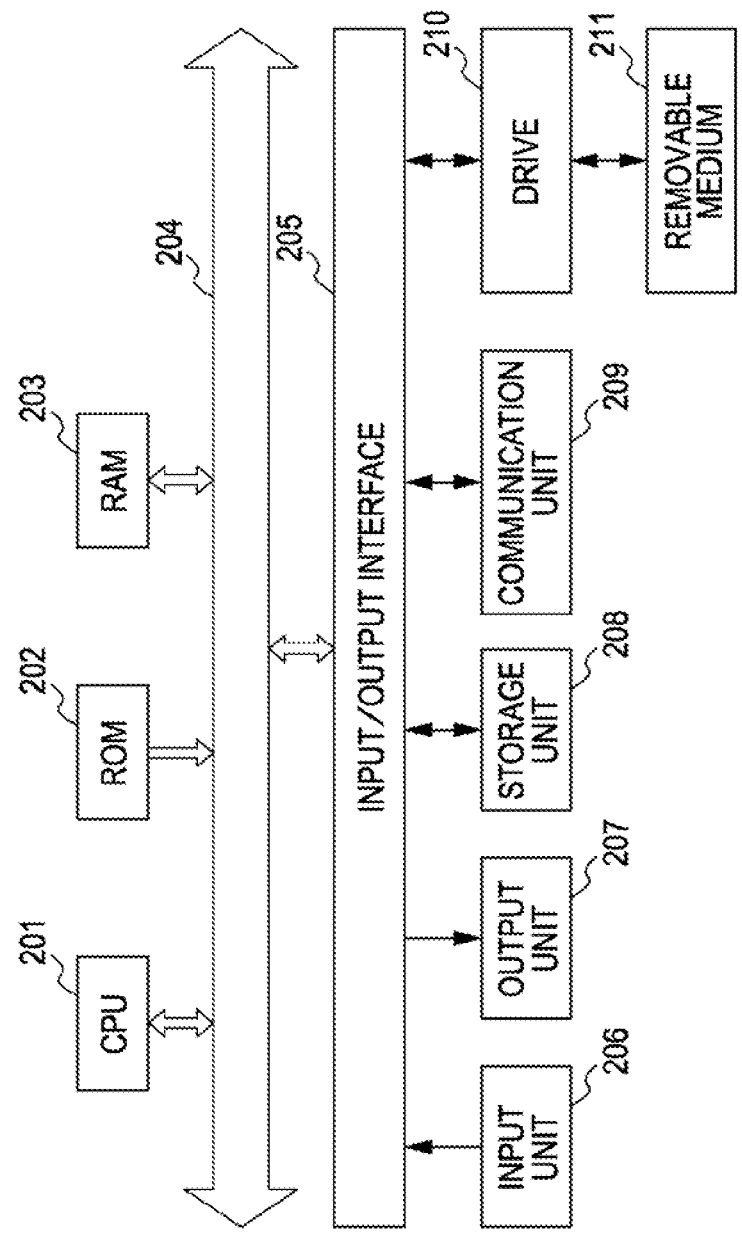

AUDIO/VISUAL AMPLIFIER, SELECTION METHOD, PROGRAM, AND RECORDING MEDIUM

CROSS REFERENCES TO RELATED APPLICATIONS

The present invention contains subject matter related to Japanese Patent Application JP 2006-248256 filed in the Japanese Patent Office on Sep. 13, 2006, the entire contents of which are incorporated herein by reference.

BACKGROUND OF THE INVENTION

1. Field of the Invention

The present invention relates to audio/visual (AV) amplifiers, selection methods, programs, and recording media, and more particularly, to an AV amplifier, a selection method, a program, and a recording medium that are capable of displaying a menu.

2. Description of the Related Art

An AV amplifier of an example of the related art has a function of assigning an input terminal that receives a particular audio signal or an input terminal that receives a particular video signal, from among terminals provided in the AV amplifier, to an input identifier, such as "VIDEO", "DVD", "TV", "CD" or the like, registered in advance in the AV amplifier, as shown in FIG. 1. In this function, setting menu items, such as assigning of an input of a digital audio signal, assigning of an input of a component video signal, and assigning of an input of a high-definition multimedia interface (HDMI) signal, are separately provided.

In FIG. 1, "assign category", such as "digital assign", "component video assign (Component V. Assign)", or "HDMI assign", indicates a category of assignment of an input terminal, such as digital, component, or HDMI. "Port", such as "VIDEO1 COAX", "VIDEO1 OPT", or the like, indicates an input terminal. "Connected device", such as "VIDEO1", "VIDEO2", "VIDEO3", or the like, indicates an input identifier of a device connected to a corresponding input terminal.

A setting procedure performed for a menu will be described below. First, a desired input terminal is selected from among input terminals provided by the menu. Second, a desired input identifier is selected from among input identifiers that can be assigned to the selected desired input terminal.

Accordingly, an input terminal is assigned to an input identifier.

In this case, a list of final states of assignment between input identifiers and input terminals is not provided.

In an example of the related art, category icons indicating corresponding categories are arranged and displayed in the horizontal direction of a menu screen and content icons indicating contents belonging to a category selected by a user are arranged and displayed in the vertical direction that is orthogonal to the direction in which the category icons are arranged (for example, see Japanese Unexamined Patent Application Publication No. 2006-86621).

SUMMARY OF THE INVENTION

Normally, a user uses a selector function of selecting an input identifier. However, in the above-mentioned technology of the related art, problems described below occur.

First, even for the same operation such as "assignment between a terminal and an input identifier", the name of a provided item of a menu and the hierarchical level within the menu of the item for achieving the operation are different depending on the assignment category. Thus, the number of menu items for setting is increased, and the specifications of a product become complicated. Therefore, it is necessary for the user to perform difficult and complicated operations.

Second, since the menu items are dispersed as described above, when a user wants to check an assignment state of a particular input identifier that has been assigned to a certain input terminal, it is necessary for the user to check information on input terminals of two types, namely, video and audio, using different menu items. That is, it is necessary for the user to perform complicated operations for checking.

Third, for checking of an assignment state, since an "input identifier" assigned to a particular "terminal" is displayed for each of the menu items of assignment categories, when the user wants to check a "terminal" assigned to a particular "input identifier", it is normally necessary for the user to cause menu items of assignment categories to be sequentially displayed and check assignment between terminals and inputs until an item corresponding to the desired "input identifier" is found.

Fourth, in the related art, the user assigns an input of an audio signal to only an input terminal that receives a digital signal and assigns an input of a video signal to only a particular terminal, such as an input terminal that receives a component signal or an HDMI terminal. Thus, it is necessary for the user to check an assignment state of an input terminal that receives an analog audio signal, an S terminal, an input terminal that receives a composite signal, or the like using a menu and a screen that are different from the above-mentioned menu and screen. This complicates not only an operation but also the specifications of a display device of an AV amplifier. Thus, the amount of unnecessary hardware and software resources increases.

It is desirable to select an input more easily and more simply using less resources.

According to an embodiment of the present invention, there is provided an audio/visual amplifier for processing video signals and audio signals including display control means for controlling display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other; and selecting means for, when the user selects the input name as the item of the menu, selecting the video signal received from the first terminal and the audio signal received from the second terminal.

The display control means may control the display of the menu such that a predetermined icon assigned to the input name is displayed so as to be assigned to the input name.

The audio/visual amplifier may further include assigning means for assigning the first terminal for receiving the video signal and the second terminal for receiving the audio signal to the input name.

The assigning means may further assign a predetermined icon to the input name.

The audio/visual amplifier may further include editing means for editing the input name.

According to another embodiment of the present invention, there is provided a selection method for use in an audio/visual amplifier for processing video signals and audio signals and for selecting a video signal and an audio signal to be processed including the steps of controlling display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other; and selecting, when the user selects the input name as the item of the menu, the video signal received from the first terminal and the audio signal received from the second terminal.

According to another embodiment of the present invention, there is provided a program for causing a computer of an audio/visual amplifier for processing video signals and audio signals to perform selection control processing for controlling selection of a video signal and an audio signal to be processed including the steps of controlling display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other; and controlling, when the user selects the input name as the item of the menu, selection of the video signal and the audio signal such that the video signal received from the first terminal and the audio signal received from the second terminal are selected.

According to another embodiment of the present invention, there is provided a recording medium on which a computer-readable program for causing an audio/visual amplifier for processing video signals and audio signals to perform selection control processing for controlling selection of a video signal and an audio signal to be processed is recorded including the steps of controlling display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other; and controlling, when the user selects the input name as the item of the menu, selection of the video signal and the audio signal such that the video signal received from the first terminal and the audio signal received from the second terminal are selected.

According to an embodiment of the present invention, display of a menu is controlled such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other. When the user selects the input name as the item of the menu, selection of the video signal and the audio signal is controlled such that the video signal received from the first terminal and the audio signal received from the second terminal are selected.

As described above, according to an embodiment of the present invention, an operation is performed using a menu.

In addition, according to an embodiment of the present invention, an input can be selected more easily and more simply using less resources.

BRIEF DESCRIPTION OF THE DRAWINGS

FIG. 1 is an illustration for explaining a function of the assignment of input terminals in an AV amplifier of the related art;

FIG. 8 is an illustration for explaining GUI images;

FIG. 10 illustrates transition of GUI images used for assigning an input terminal to an input name;

FIG. 19 shows an example of input terminals that can be assigned to input names;

FIG. 20 shows an example of input terminals that can be assigned to input names;

FIG. 21 illustrates transition of GUI images used for processing for editing an input name;

FIG. 27 is a flowchart of a process for assignment;

FIG. 28 is a flowchart of a process for editing an input name; and

FIG. 29 is a block diagram showing an example of the configuration of a personal computer.

DESCRIPTION OF THE PREFERRED EMBODIMENTS

Figure 2:
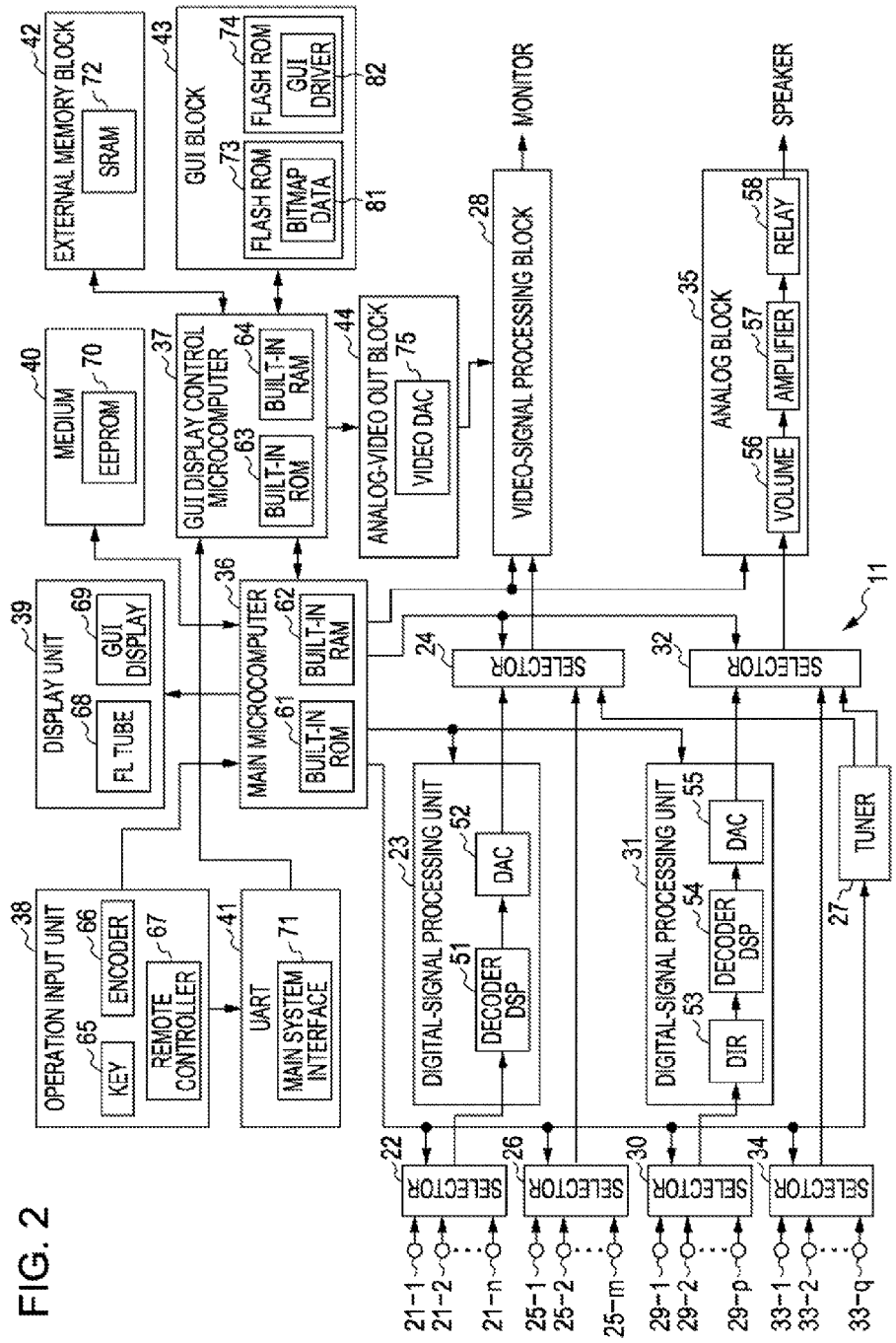
FIG. 2 is a block diagram showing an example of the configuration of an AV amplifier according to an embodiment of the present invention.

Before describing preferred embodiments of the present invention, the correspondence between the features of the present invention and embodiments described in the description of the preferred embodiments will be discussed below. This description is intended to assure that embodiments supporting the invention are described in the description of the preferred embodiments. Thus, even if an embodiment described in the description of the preferred embodiments is not described here as relating to an embodiment corresponding to a feature of the present invention, this does not mean that the embodiment does not relate to that feature of the present invention. In contrast, even if an embodiment is described here as relating to a feature of the present invention, this does not mean that the embodiment does not relate to other features of the present invention.

An audio/visual amplifier according to an embodiment of the present invention for processing video signals and audio signals includes display control means (for example, a display controller 101 shown in FIG. 4) for controlling display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other; and selecting means (for example, a selector 22, 24, 26, 30, 32, or 34 shown in FIG. 3) for, when the user selects the input name as the item of the menu, selecting the video signal received from the first terminal and the audio signal received from the second terminal.

The audio/visual amplifier may further include assigning means (for example, an assigning unit 103 shown in FIG. 4) for assigning the first terminal for receiving the video signal and the second terminal for receiving the audio signal to the input name.

The audio/visual amplifier may further include editing means (for example, an input name editing unit 104 shown in FIG. 4) for editing the input name.

A selection method and program according to an embodiment of the present invention for use in an audio/visual amplifier for processing video signals and audio signals and for selecting a video signal and an audio signal to be processed includes the steps of controlling (for example, step S11 shown in FIG. 26) display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other; and selecting (for example, step S13 of FIG. 26), when the user selects the input name as the item of the menu, the video signal received from the first terminal and the audio signal received from the second terminal.

FIG. 2 is a block diagram showing an example of the configuration of an AV amplifier 11 according to an embodiment of the present invention. The AV amplifier 11 includes input terminals 21-1 to 21-*n* (n is a positive integer), a selector 22, a digital-signal processing unit 23, a selector 24, input terminals 25-1 to 25-*m* (m is a positive integer), a selector 26, a tuner 27, a video-signal processing block 28, input terminals 29-1 to 29-*p* (p is a positive integer), a selector 30, a digital-signal processing unit 31, a selector 32, input terminals 33-1 to 33-*q* (q is a positive integer), a selector 34, an analog block 35, a main microcomputer 36, a graphical user interface (GUI) display control microcomputer 37, an operation input unit 38, a display unit 39, a medium 40, a universal asynchronous receiver/transmitter (UART) 41, an external memory block 42, a GUI block 43, and an analog-video out block 44.

Each of the input terminals 21-1 to 21-*n* is an input terminal for receiving a digital video signal, such as an HDMI video signal or the like. A video signal received by each of the input terminals 21-1 to 21-*n* is supplied to the selector 22.

Under the control of the main microcomputer 36, the selector 22 selects one of the video signals received from the input terminals 21-1 to 21-*n*. The video signal selected by the selector 22 is supplied to the digital-signal processing unit 23.

The digital-signal processing unit 23 performs various types of signal processing on the digital video signal supplied via one of the input terminals 21-1 to 21-*n* and the selector 22. The digital-signal processing unit 23 supplies to the selector 24 an analog video signal obtained as a result of the various types of signal processing.

The digital-signal processing unit 23 includes a digital signal processor (decoder DSP) 51 and a digital-to-analog converter (DAC) 52.

The decoder DSP 51 decodes an encoded video signal. The decoder DSP 51 supplies to the DAC 52 a video signal obtained as a result of the decoding. The DAC 52 converts the decoded digital video signal into an analog video signal by digital-to-analog conversion. The DAC 52 supplies to the selector 24 the analog video signal obtained as a result of the digital-to-analog conversion.

Each of the input terminals 25-1 to 25-*m* is an input terminal for receiving an analog video signal, such as a pin jack for receiving a composite signal, a pin jack for receiving a component signal, a pin jack for receiving an RGB signal, or a switch (S) terminal. A video signal received by each of the input terminals 25-1 to 25-*m* is supplied to the selector 26.

Under the control of the main microcomputer 36, the selector 26 selects one of the video signals received from the input terminals 25-1 to 25-*m*. The video signal selected by the selector 26 is supplied to the selector 24.

Under the control of the main microcomputer 36, the tuner 27 supplies to the selector 24 a video signal of an image of a program that is being broadcasted and supplies to the selector 32 an audio signal of sound of the program that is being broadcasted.

Under the control of the main microcomputer 36, the selector 24 selects one of the video signal supplied from the digital-signal processing unit 23, the video signal selected by the selector 26, and the video signal supplied from the tuner 27. The video signal selected by the selector 24 is supplied to the video-signal processing block 28.

Under the control of the main microcomputer 36, the video-signal processing block 28 performs various types of signal processing on the supplied video signal. In addition, the video-signal processing block 28 supplies to a monitor a video signal obtained as a result of the signal processing and displays various images on the monitor.

Each of the input terminals 29-1 to 29-*p* is an input terminal for receiving a digital audio signal, such as a pin jack or a receptacle for connecting an optical cable or a coaxial cable. An audio signal received by each of the input terminals 29-1 to 29-*p* is supplied to the selector 30.

Under the control of the main microcomputer 36, the selector 30 selects one of the audio signals received from the input terminals 29-1 to 29-*p*. The audio signal selected by the selector 30 is supplied to the digital-signal processing unit 31.

The digital-signal processing unit 31 performs various types of signal processing on the digital audio signal supplied via one of the input terminals 29-1 to 29-*p* and the selector 30. The digital-signal processing unit 31 supplies to the selector 32 an analog audio signal obtained as a result of the various types of signal processing.

The digital-signal processing unit 31 includes a digital interface receiver (DIR) 53, a decoder DSP 54, and a DAC 55.

The DIR 53 converts an optical audio signal into an electrical audio signal. The DIR 53 supplies to the decoder DSP 54 the electrical audio signal obtained by the conversion.

The decoder DSP 54 decodes an encoded audio signal. The decoder DSP 54 supplies to the DAC 55 an audio signal obtained by the decoding. The DAC 55 converts the decoded digital audio signal into an analog audio signal by digital-to-analog conversion. The DAC 55 supplies to the selector 32 the analog audio signal obtained by the digital-to-analog conversion.

Each of the input terminals 33-1 to 33-*q* is an input terminal for receiving an analog audio signal, such as a pin jack or a phono jack. An audio signal received by each of the input terminals 33-1 to 33-*q* is supplied to the selector 34.

Under the control of the main microcomputer 36, the selector 34 selects, from among the audio signals received from the input terminals 33-1 to 33-*q*, an audio signal or a set of audio signals, such as a so-called stereo audio signal. The audio signal selected by the selector 34 is supplied to the selector 32.

Under the control of the main microcomputer 36, the selector 32 selects, from among the audio signal supplied from the digital-signal processing unit 31, the audio signal selected by the selector 34, and the audio signal supplied from the tuner 27, an audio signal or a set of audio signals, such as a stereo audio signal. The audio signal selected by the selector 32 is supplied to the analog block 35.

Under the control of the main microcomputer 36, the analog block 35 performs various types signal processing on the supplied audio signal. In addition, the analog block 35 supplies to a speaker an audio signal obtained as a result of the signal processing and causes the speaker to output various types of sound.

The analog block 35 includes a volume control 56, an amplifier 57, and a relay 58. The volume control 56 adjusts the level of the audio signal supplied to the analog block 35. The amplifier 57 amplifies the audio signal whose level has been adjusted by the volume control 56. The audio signal amplified by the amplifier 57 is supplied to the speaker through the relay 58. When the relay 58 is turned on, the speaker is driven and controlled so as to output sound in accordance with the audio signal supplied from the amplifier 57. When the relay 58 is turned off, the speaker is not driven and no sound is output from the speaker.

The main microcomputer 36 is an embedded microcomputer or the like. The main microcomputer 36 performs processing on a video signal and an audio signal of the AV amplifier 11 or controls the execution of the processing on the video signal and the audio signal of the AV amplifier 11.

The main microcomputer 36 includes a built-in read-only memory (ROM) 61 and a built-in random-access memory (RAM) 62. A program to be executed by the main microcomputer 36 and data necessary for the execution of the program are stored in advance in the built-in ROM 61. The built-in RAM 62 temporarily stores a program to be executed by the microcomputer 36 or data necessary for the execution of the program.

The GUI display control microcomputer 37 is an embedded microcomputer or the like and controls GUI display.

The GUI display control microcomputer 37 includes a built-in ROM 63 and a built-in RAM 64. A program to be executed by the GUI display control microcomputer 37 and data necessary for the execution of the program are stored in advance in the built-in ROM 63. The built-in RAM 64 temporarily stores a program to be executed by the GUI display control microcomputer 37 or data necessary for the execution of the program.

The operation input unit 38 supplies a signal corresponding to a user operation to the main microcomputer 36 or the UART 41.

The operation input unit 38 includes a key 65, an encoder 66, and a remote controller 67. When a user presses the key 65, a signal corresponding to whether or not the key is pressed is output. When the user spins or rotates the encoder 66, a signal corresponding to the spinning or rotation is output.

The remote controller 67 is used by the user when the remote controller 67 is separated from the main body of the AV amplifier 11. The remote controller 67 outputs a signal corresponding to a user operation.

The display unit 39 displays images or characters indicating the state of the AV amplifier 11. The display unit 39 includes a fluorescent lamp (FL) tube 68 and a GUI display 69. The FL tube 68 displays predetermined images or characters or displays images or characters using a matrix. The GUI display 69 is a liquid crystal display (LCD), an organic electro-luminescence (EL) display, or the like and displays images such as icons, characters, or the like.

A GUI image may be displayed on the GUI display 69 or on the monitor connected to the AV amplifier 11.

The medium 40 is a removable memory card, a so-called universal serial bus (USB) memory, or the like. The medium 40 contains a semiconductor memory, such as an electrically erasable programmable read-only memory (EEPROM) 70 that is capable of electrically rewriting or erasing a stored data or program, and stores various data or programs.

The medium 40 may be a hard disk, an optical disk, or the like. When the medium 40 is an optical disk or the like, a drive for writing data or a program into the medium 40 or for reading data or a program from the medium 40 is provided.

The UART 41 is a controller for serial data communication and includes a main system interface 71, which is an interface for the operation input unit 38. The UART 41 converts a serial signal supplied from the operation input unit 38 into a parallel signal. The UART 41 supplies to the GUI display control microcomputer 37 the parallel signal obtained by the conversion.

The external memory block 42 includes a semiconductor memory, such as a static random access memory (SRAM) 72, and stores a program to be executed by the GUI display control microcomputer 37 or various data necessary for the execution of the program.

The GUI block 43 includes a semiconductor memory and stores various data and programs necessary for displaying GUI images used by the GUI display control microcomputer 37. The GUI block 43 includes a flash ROM 73 and a flash ROM 74. The flash ROM 73 stores bitmap data 81, such as icons, windows, or characters, necessary for displaying GUI images. The flash ROM 74 stores a GUI driver 82, which is a program necessary for displaying GUI images.

Under the control of the GUI display control microcomputer 37, the analog-video out block 44 generates a signal for displaying a GUI image. A video DAC 75 provided in the analog-video out block 44 converts a digital video signal generated by the analog-video out block 44 into an analog video signal.

The video-signal processing block 28 causes a video signal received by one of the input terminals 21-1 to 21-$n$ or one of the input terminals 25-1 to 25-$m$ and a video signal supplied from the analog-video out block 44 for displaying a GUI image to overlap each other, and displays on the monitor the GUI image together with an image corresponding to the video signal received by one of the input terminals 21-1 to 21-$n$ or one of the input terminals 25-1 to 25-$m$.

Figure 3:
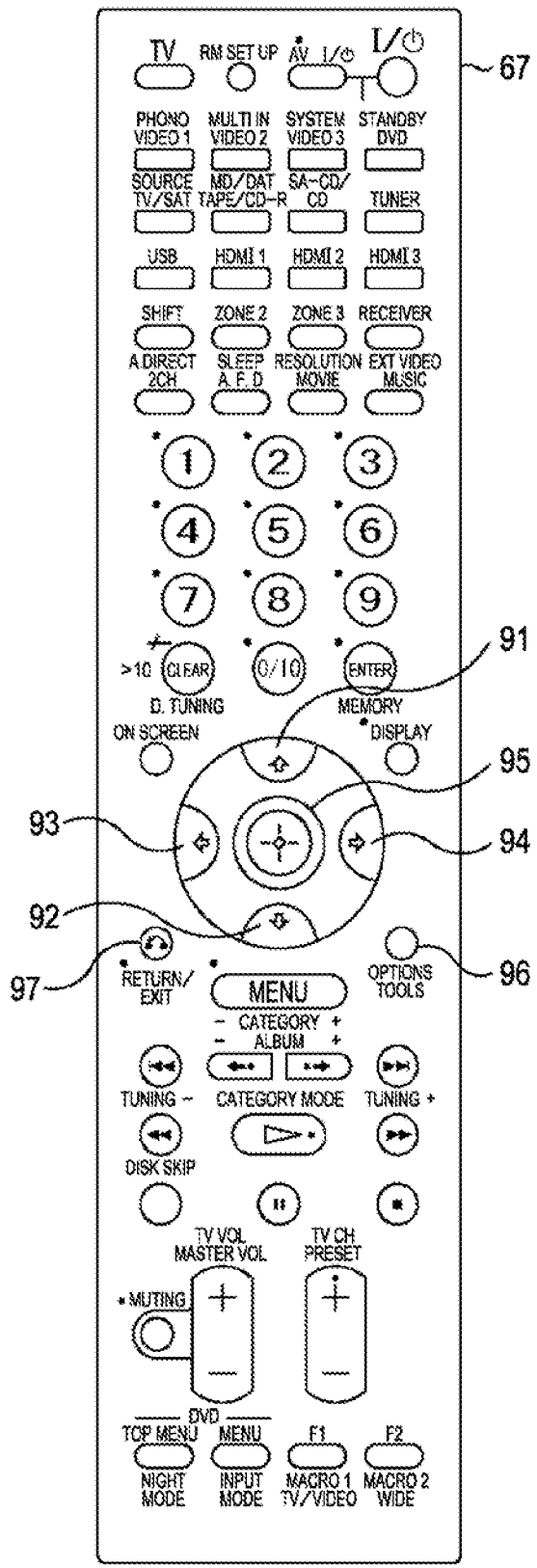
FIG. 3 illustrates the appearance of a remote controller.

FIG. 3 is an external view of the remote controller 67. The remote controller 67 includes a so-called up-arrow key 91 for instructing to focus an item above the currently focused item among GUI menu items, a so-called down-arrow key 92 for instructing to focus an item below the currently focused item among the GUI menu items, a so-called left-arrow key 93 for instructing to focus an item to the left of the currently focused item among the GUI menu items, and a so-called right-arrow key 94 for instructing to focus an item to the right of the currently focused item among the GUI menu items. The remote controller 67 also includes a key 95, which is a so-called select key. For example, the select key 95 is disposed between the keys 91 and 92, which are aligned in a vertical direction, and between the keys 93 and 94, which are aligned in a horizontal direction.

The remote controller 67 also includes a key 96 for instructing to display an option menu. The remote controller 67 also includes a key 97, which is a so-called return key.

A state in which an item is focused is a state in which attention is drawn to the item in order to select the item. For example, a focused item is highlighted in GUI. More specifically, the focused item is reversely displayed or displayed in a different color. Hereinafter, a focused item may be referred to as an item of interest.

Figure 4:
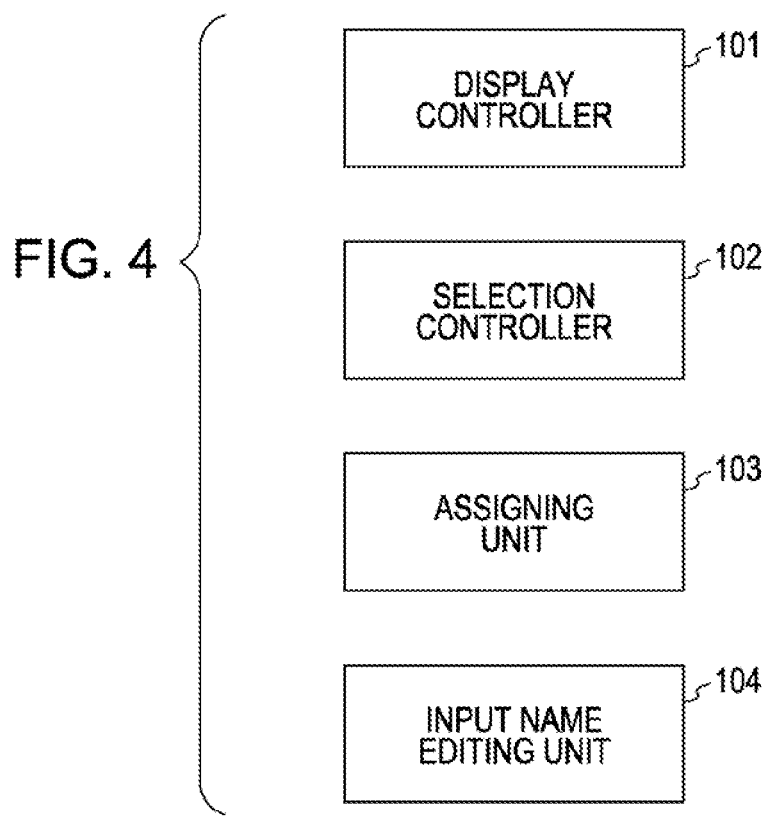
FIG. 4 is a block diagram showing the configuration of functions to be implemented by a main microcomputer and a GUI display control microcomputer that perform programs.

FIG. 4 is a block diagram showing the configuration of functions implemented by the main microcomputer 36 and the GUI display control microcomputer 37 each performing a program.

A display controller 101, a selection controller 102, an assigning unit 103, and an input name editing unit 104 are implemented when each of the main microcomputer 36 and the GUI display control microcomputer 37 performs a program.

The display controller 101 is implemented by the GUI display control microcomputer 37 that performs a program. The display controller 101 controls the display of a GUI image. The display controller 101 controls the display of a menu, as a GUI image, for allowing the AV amplifier 11 to perform various types of processing.

In the AV amplifier 11, menu items as GUI images are hierarchized. An item at a predetermined hierarchical level is associated with a predetermined item among items at a hierarchical level immediately below the predetermined hierarchical level or is associated with none of the items at the hierarchical level immediately below the predetermined hierarchical level. In principle, an item that is associated with an item at the hierarchical level immediately below the predetermined hierarchical level is used for instructing to select the item at the hierarchical level immediately below the predetermined hierarchical level. In addition, in principle, an item that is associated with none of the items at the hierarchical level immediately below the predetermined hierarchical level is used for instructing to execute predetermined processing.

Hereinafter, when viewed from a predetermined item at a predetermined hierarchical level, an item that is located at a hierarchical level immediately below the predetermined hierarchical level and that is associated with the predetermined item at the predetermined hierarchical level is referred to as a child. In contrast, when viewed from a child item at a predetermined hierarchical level, an item among items at a hierarchical level immediately above the predetermined hierarchical level that is associated with the child item is referred to as a parent.

For example, the display controller 101 controls display of a menu on the monitor or the GUI display 69 such that an input name, which is an item of the menu and represents a unit of an input to be selected by a user, one of the names of the input terminals 21-1 to 21-*n* or one of the names of the input terminals 25-1 to 25-*m* that is assigned to the input name, and one of the names of the input terminals 29-1 to 29-*p* or one of the names of the input terminals 33-1 to 33-*q* that is assigned to the input name are displayed so as to be assigned to each other.

The selection controller 102 is implemented by the main microcomputer 36 that performs a program. The selection controller 102 controls the selection of an input signal. For example, when the user selects an input name as an item of the menu, the selection controller 102 controls the selectors 22, 24, 26, 30, 32, and 34 so as to select a video signal received from one of the input terminals 21-1 to 21-*n* or one of the input terminals 25-1 to 25-*m* that is assigned to the input name and to select an audio signal received from one of the input terminals 29-1 to 29-*p* or one of the input terminals 33-1 to 33-*q* that is assigned to the input name.

The assigning unit 103 is implemented by the GUI display control microcomputer 37 that performs a program. The assigning unit 103 assigns one of the input terminals 21-1 to 21-*n* or one of the input terminals 25-1 to 25-*m* and one of the input terminals 29-1 to 29-*p* or one of the input terminals 33-1 to 33-*q* to an input name. The assigning unit 103 achieves assignment by storing data indicating an assignment state into the built-in ROM 63, the flash ROM 74, or the like.

The input name editing unit 104 is implemented by the GUI display control microcomputer 37 that performs a program. The input name editing unit 104 edits an input name in accordance with a user operation.

The main microcomputer 36 that performs a single program may implement the display controller 101, the selection controller 102, the assigning unit 103, and the input name editing unit 104.

The display of GUI images controlled by the display controller 101 and processing of the selection controller 102, the assigning unit 103, and the input name editing unit 104 performed in accordance with user operations for GUI will be described.

Regarding assigning of one of the input terminals 21-1 to 21-*n* or one of the input terminals 25-1 to 25-*m* and one of the input terminals 29-1 to 29-*p* or one of the input terminals 33-1 to 33-*q* to an input name, irrespective of the type of input terminal, for example, an input terminal for receiving an analog audio signal, an input terminal for receiving a composite video signal, or an S terminal, assigning of input terminals to input names can be achieved with a single menu.

The configuration of GUI screens used for assigning one of the input terminals 21-1 to 21-*n* or one of the input terminals 25-1 to 25-*m* and one of the input terminals 29-1 to 29-*p* or one of the input terminals 33-1 to 33-*q* to an input name will be described.

GUI screens used for assignment are an Input Selection screen, an Input Assign screen, and a Name Input screen.

That is, first, the Input Selection screen is one of the GUI screens. The Input Selection screen is used, by a user, for selecting a desired input name from the list of input names, selecting a video signal and an audio signal in accordance with the selected input name, and switching outputs into an image and sound based on the selected video signal and audio signal. On the Input Selection screen, a menu for entering the Input Assign screen or the Name Input screen is provided as an option menu.

Second, the Input Assign screen is one of the GUI screens. The Input Assign screen is used for assigning an input terminal for receiving a video signal and an input terminal for receiving an audio signal to an input name displayed on the Input Selection screen. On the Input Assign screen, an icon corresponding to an input name displayed on the Input Selection screen can be selected.

Third, the Name Input screen is one of the GUI screens. The Name Input screen is used for changing an input name. On the Name Input screen, a software keyboard is provided as a text input interface. A change performed on the Name Input screen is reflected in the display of an input name on the Input Selection screen. That is, an input name that has been changed on the Name Input screen is displayed on the Input Selection screen as an input name.

Screen transition between the Input Selection screen, the Input Assign screen, and the Name Input screen and the outline of a procedure for assigning one of the input terminals 21-1 to 21-*n* or one of the input terminals 25-1 to 25-*m* and one of the input terminals 29-1 to 29-*p* or one of the input terminals 33-1 to 33-*q* to an input name will be described.

On the Input Selection screen, from among input names set for the AV amplifier 11, an input name to be assigned to one of the input names 21-1 to 21-*n* or one of the input terminals 25-1 to 25-1 to 25-m and/or to be assigned to one of the input terminals 29-1 to 29-p or one of the input terminals 33-1 to 33-q is focused.

In a state in which a desired input name is focused, an option menu is opened. From among items of the option menu, an item described as "Input Assign" or the like, which is used for assignment between an input name and an input terminal is selected. Accordingly, the Input Assign screen is displayed.

The list of icons, names of input terminals for receiving video signals, and names of input terminals for receiving audio signals, which can be assigned to an input name focused on the Input Selection screen, is displayed.

The user is able to select desired items from the list of the icons, the names of the input terminals for receiving video signals, and the names of the input terminals for receiving audio signals. Thus, the icon, the input terminal for receiving a video signal, and the input terminal for receiving an audio signal, which have been selected by the user, are assigned to the input name focused on the Input Selection screen.

On the Input Selection screen, an icon illustrating the shape of a device or an input terminal is provided, so that the user is able to recognize an input name. In general, although a name desired by the user can be set as an input identifier for an AV amplifier, a long character string is not used as an input identifier since there is a limitation in the number of characters that can be displayed on a display tube of the AV amplifier or the GUI screen. Thus, since an icon as well as an input name is displayed, the user is able to recognize the input name even if the input name has a large number of characters.

On the Input Assign screen, as an item for selecting an input terminal for receiving a video signal, an item for selecting an input terminal for receiving a composite signal or for selecting an S terminal as well as an item for selecting an input terminal for receiving a component signal is displayed in parallel. In addition, as an item for receiving an audio signal and not receiving a video signal, that is, for assigning no video signal to an input name since only sound is received, an item "None" is displayed in parallel.

On the Input Assign screen, as an item for selecting an input terminal for receiving an audio signal, an item for selecting an input terminal for receiving an analog audio signal and an item for selecting an input terminal for receiving a digital audio signal that can be assigned to an input name are displayed in parallel.

The display of GUI images controlled by the display controller 101 will be described with reference to FIGS. 5 to 25.

Figure 5:
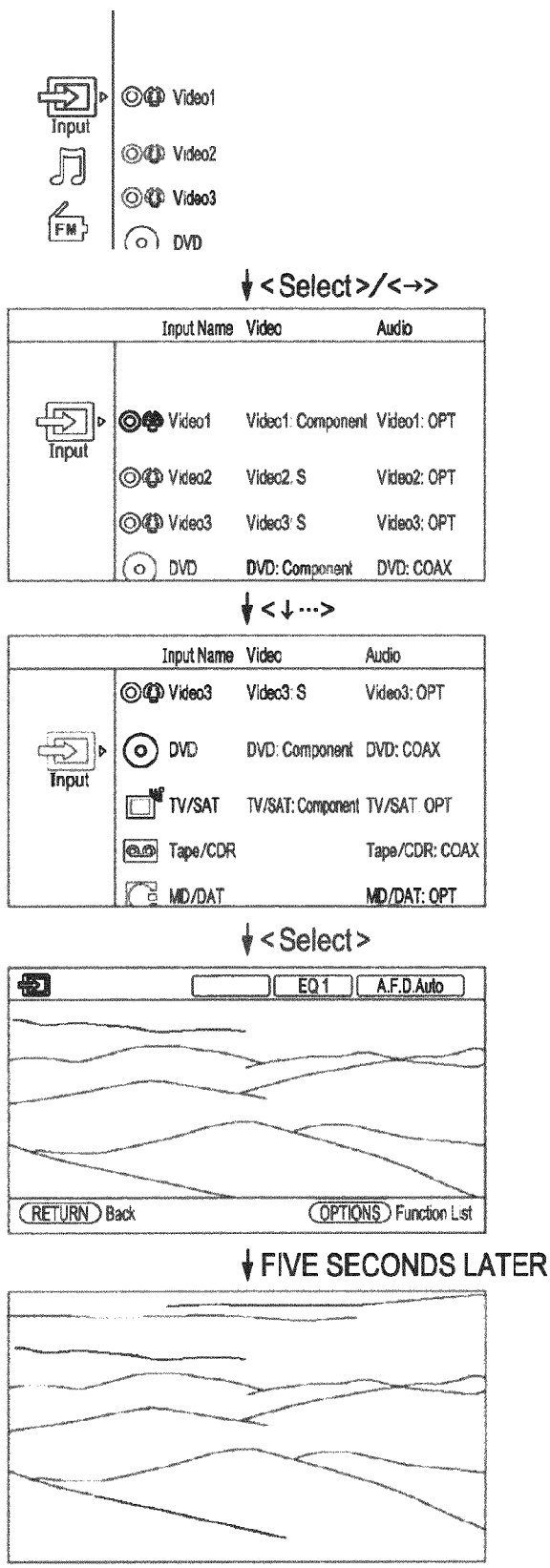
FIG. 5 illustrates transition of GUI images used for input switching.

FIG. 5 illustrates transition of GUI images used for selecting a video signal and an audio signal received from one of the input terminals 21-1 to 21-n or one of the input terminals 25-1 to 25-m and from one of the input terminals 29-1 to 29-p or one of the input terminals 33-1 to 33-q, that is, for input switching. GUI images used for input switching correspond to the Input Selection screen.

With GUI of the AV amplifier 11, items at a hierarchical level are displayed so as to be aligned in the vertical direction on the display screen.

From among items of a menu, items at the highest hierarchical level are, for example, an item for input switching, an item for selection of music, an item for selection of a channel of frequency modulation (FM) radio broadcasting, an item for selection of a channel of amplitude modulation (AM) radio broadcasting, an item for selection of a channel of satellite radio (XM radio) broadcasting, an item for setting, and the like.

Figure 6:
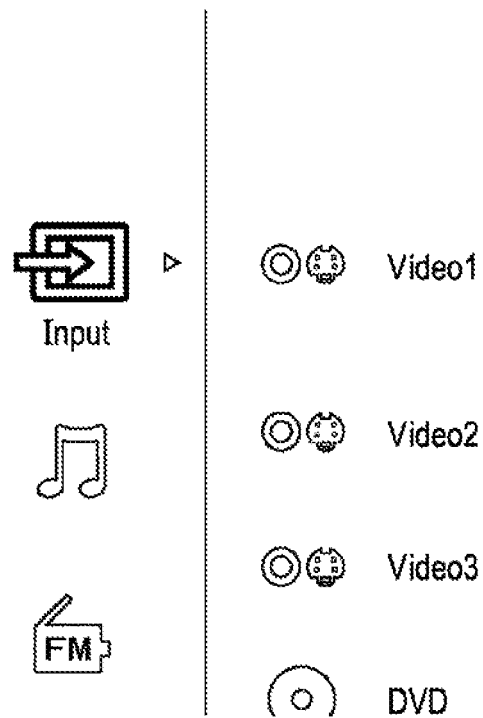
FIG. 6 is an illustration for explaining GUI images.

As shown in FIG. 6, which corresponds to the top drawing of FIG. 5, an item for input switching, which includes an icon formed by the combination of a square and a right arrow and letters "Input", is displayed on the upper left of the screen, an item for selection of music, which includes an icon illustrating a note, is displayed on the left of the screen and immediately below the item for input switching, and an item for selection of a channel of FM radio broadcasting, which includes an illustration of the appearance of a radio including letters "FM" inside the illustration of the radio, is displayed on the left of the screen and immediately below the item for selection of music.

That is, the item for input switching, the item for selection of music, and the item for selection of a channel of FM radio broadcasting, which are located at the highest hierarchical level, are disposed on the left of the screen so as to be aligned in the vertical direction.

To the right of the items at the highest hierarchical level, which are disposed so as to be aligned in the vertical direction, items at the second highest hierarchical level, which is immediately below the highest hierarchical level, are displayed.

More specifically, when the item for input switching, from among the items at the highest hierarchical level, is focused, child items of the item for input switching, from among the items at the second highest hierarchical level, are displayed to the right of the items at the highest hierarchical level. The child items of the item for input switching each serve as an input name representing a unit of an input to be selected by the user.

In this case, a vertical line is displayed between the items at the highest hierarchical level and the items at the second highest hierarchical level. That is, a vertical line is displayed between items at a predetermined hierarchical level disposed so as to be aligned in the vertical direction and items at a hierarchical level immediately below the predetermined hierarchical level disposed so as to be aligned in the vertical direction. With the display of a vertical line, the user is able to recognize hierarchical levels.

For a focused item among the items at the highest hierarchical level, an icon corresponding to the item and letters representing the name of the item are displayed. For an unfocused item among the items at the highest hierarchical level, only an icon corresponding to the item is displayed.

When an item has a child item, a right arrow is displayed to the right and adjacent to the item. With the display described above, the user is able to know whether each item has a child item.

As shown in FIG. 6, an item "Video1", which includes an icon formed by the combination of an illustration of a pin jack and an illustration of an S terminal and letters "Video1" indicating the name of the item, is displayed to the right of the item for input switching, and an item "Video2", which includes an icon formed by the combination of an illustration of a pin jack and an illustration of an S terminal and letters "Video2" indicating the name of the item, is displayed below the item "Video1". In addition, an item "Video3", which includes an icon formed by the combination of an illustration of a pin jack and an illustration of an S terminal and letters "Video3" indicating the name of the item, is displayed below the item "Video2", and an item "DVD", which includes an icon illustrating an optical disk and letters "DVD" indicating the name of the item, is displayed below the item "Video3".

That is, the item "Video1", the item "Video2", the item "Video3", and the item "DVD" are input names and disposed so as to be aligned in the vertical direction to the right of the items at the highest hierarchical level.

In a state in which the item for input switching is focused, when the right-arrow key 94 or the select key 95 of the remote controller 67 is pressed, the item for input switching is selected. Thus, the screen showing the GUI images shown in FIG. 6 is changed to the screen showing GUI images shown in FIG. 7, which corresponds to the second drawing from the top of FIG. 5.

Figure 7:
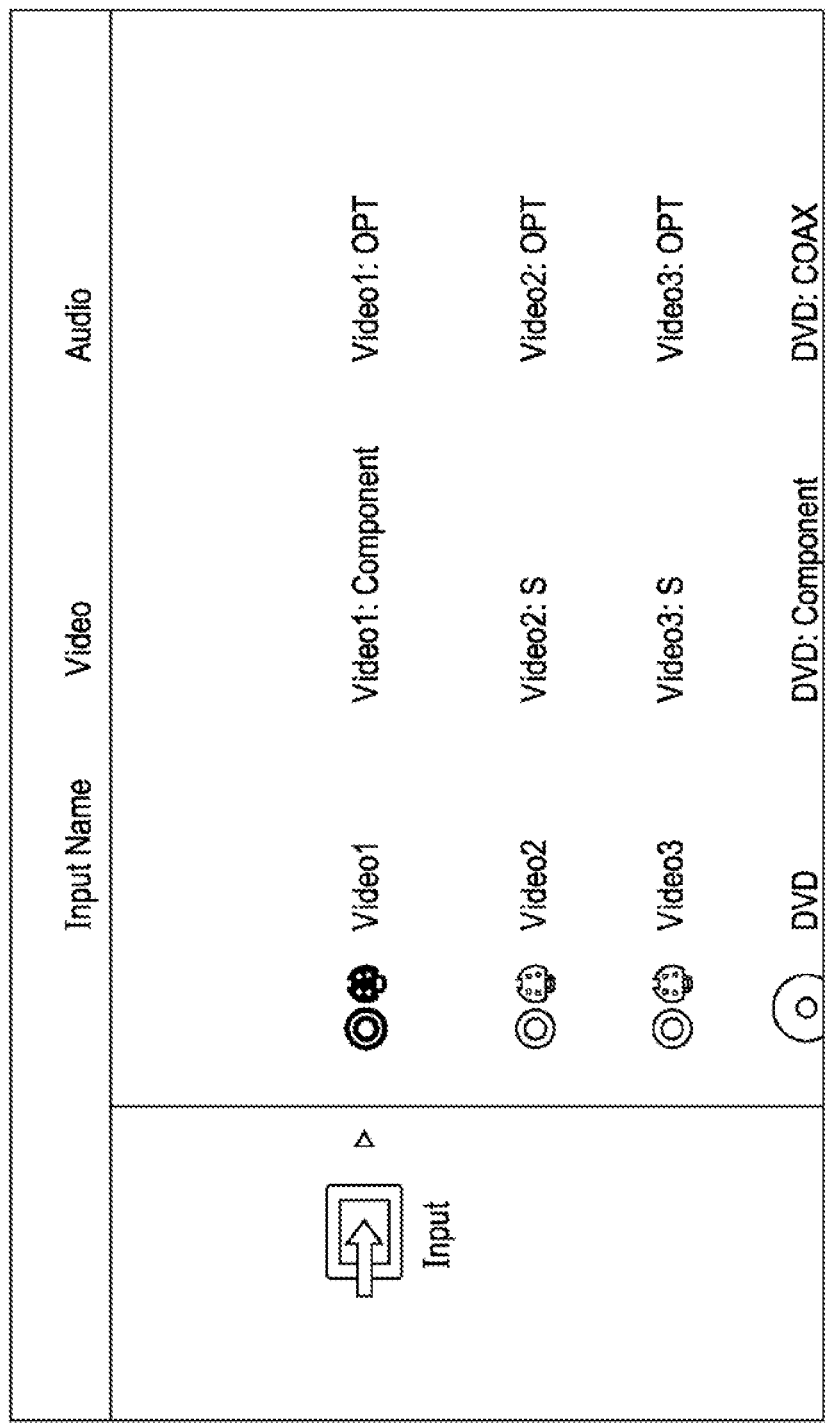
FIG. 7 is an illustration for explaining GUI images.

As shown in FIG. 7, on the left of the screen, only the selected item for input switching among the items at the highest hierarchical level is displayed. To the right of the item for input switching, input names, each representing a unit of an input to be selected by the user, of child items of the item for input switching among items at the second highest hierarchical level are displayed. To the right of the input names, names of input terminals assigned to the input names are displayed.

For a selected item at the highest hierarchical level, an icon corresponding to the item and letters indicating the name of the item are displayed.

As shown in FIG. 7, to the right of the item "Video1", "Video1:Component", which indicates the name of an input terminal assigned to the item "Video1" among the input terminals 21-1 to 21-$n$ or the input terminals 25-1 to 25-$m$ for receiving video signals, and "Video1:OPT", which indicates the name of an input terminal assigned to the item "Video1" among the input terminals 29-1 to 29-$p$ or the input terminals 33-1 to 33-$q$ for receiving audio signals, are displayed.

To the right of the item "Video2", "Video2:S", which indicates the name of an input terminal assigned to the item "Video2" among the input terminals 21-1 to 21-$n$ or the input terminals 25-1 to 25-$m$ for receiving video signals, and "Video2:OPT", which indicates the name of an input terminal assigned to the item "Video2" among the input terminals 29-1 to 29-$p$ or the input terminals 33-1 to 33-$q$ for receiving audio signals, are displayed.

To the right of the item "Video3", "Video3:S", which indicates the name of an input terminal assigned to the item "Video3" among the input terminals 21-1 to 21-$n$ or the input terminals 25-1 to 25-$m$ for receiving video signals, and "Video3:OPT", which indicates the name of an input terminal assigned to the item "Video3" among the input terminals 29-1 to 29-$p$ or the input terminals 33-1 to 33-$q$ for receiving audio signals, are displayed.

To the right of the item "DVD", "DVD:Component", which indicates the name of an input terminal assigned to the item "DVD" among the input terminals 21-1 to 21-$n$ or the input terminals 25-1 to 25-$m$ for receiving video signals, and "DVD:COAX", which indicates the name of an input terminal assigned to the item "DVD" among the input terminals 29-1 to 29-$p$ or the input terminals 33-1 to 33-$q$ for receiving audio signals, are displayed.

In a state in which the item "Video1" is focused, as shown in FIG. 7, when the down-arrow key 92 of the remote controller 67 is pressed three times, the item "DVD", which is the third item down from the item "Video1", is focused, as shown in FIG. 8, which corresponds to the third drawing from the top of FIG. 5.

In this case, items serving as input names are scrolled such that the focused item "DVD" is displayed to the right and adjacent to the selected item for input switching.

In a state in which the item "DVD" is focused, as shown in FIG. 8, when the select key 95 of the remote controller 67 is pressed, the item "DVD" is selected. Thus, a video signal received by an input terminal that is named as "DVD:Component" and that is assigned to the item "DVD" among video signals received by the input terminals 21-1 to 21-$n$ or the input terminals 25-1 to 25-$m$ is selected, and an audio signal received by an input terminal that is named as "DVD:COAX" and that is assigned to the item "DVD" among audio signals received by the input terminals 29-1 to 29-$p$ or the input terminals 33-1 to 33-$q$ is selected. As shown in the fourth drawing from the top of FIG. 5, an image corresponding to the selected video signal is displayed on the monitor, and sound corresponding to the selected audio signal is output from the speaker.

That is, the selection controller 102 causes the selectors 22, 24, 26, 30, 32, and 34 to select a video signal received from the input terminal that is named as "DVD:Component" and that is assigned to the item "DVD" among video signals received from the input terminals 22-1 to 22-$n$ or the input terminals 25-1 to 25-$m$ and to select the audio signal received from an input terminal that is named as "DVD:COAX" and that is assigned to the item "DVD" among audio signals received from the input terminals 29-1 to 29-$p$ or the input terminals 33-1 to 33-$q$.

Figure 9:
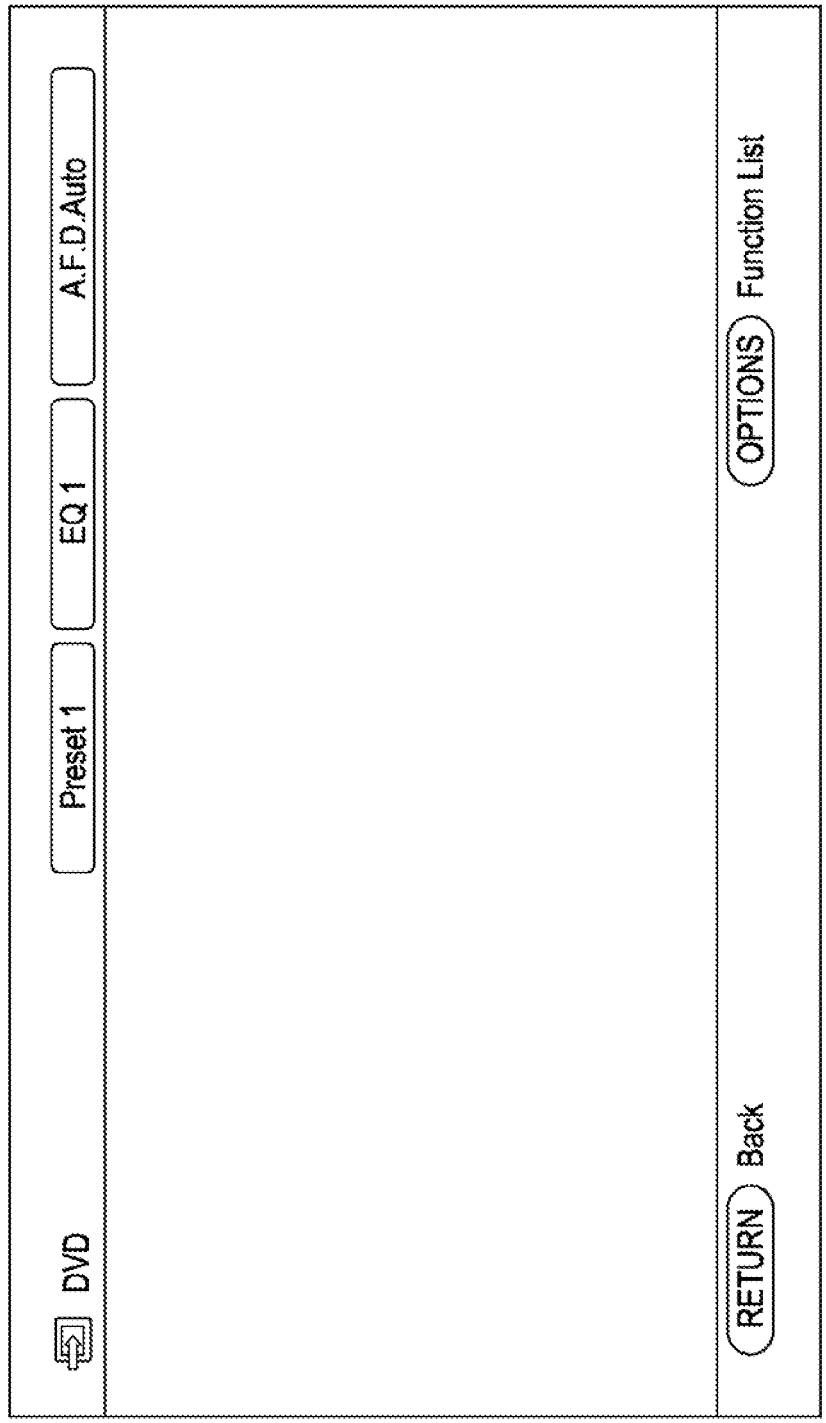
FIG. 9 is an illustration for explaining GUI images.

In this case, for example, when the item "DVD" is selected, a header and a footer indicating the selected item "DVD", that is, the selected input name and the like as well as an image corresponding to the selected video signal is displayed on the monitor, as shown in FIG. 9, for five seconds.

Then, after five seconds has passed since the selection of the item "DVD", the header and the footer are erased, as shown in the bottom drawing of FIG. 5.

As described above, input can be switched easily.

Assigning of one of the input terminals 21-1 to 21-$n$ or one of the input terminals 25-1 to 25-$m$ for receiving video signals and one of the input terminals 29-1 to 29-$p$ or one of the input terminals 33-1 to 33-$q$ for receiving audio signals to an input name, that is, assigning of an input terminal to an input name, will be described with reference to FIGS. 10 to 18.

FIG. 10 shows transition of GUI images used for assigning an input terminal to an input name. The GUI images used for processing for assigning an input terminal to an input name correspond to the Input Assign screen.

Figure 11:
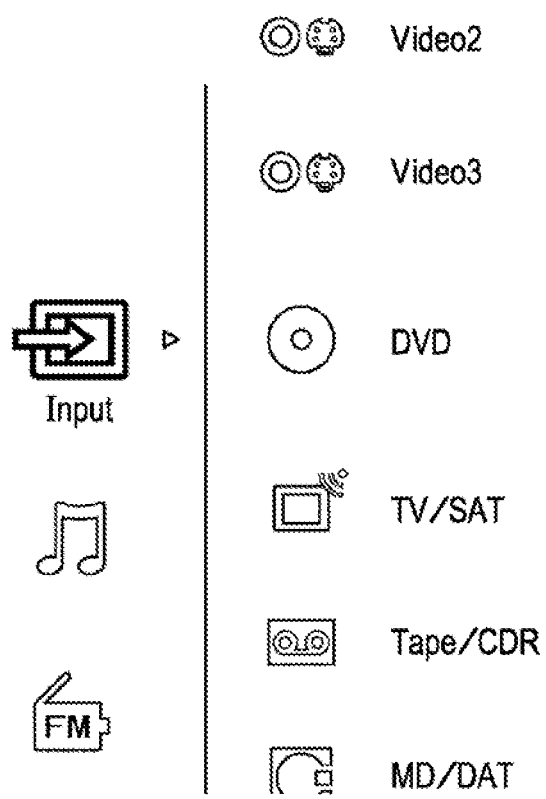
FIG. 11 is an illustration for explaining GUI images.

In a state shown in the upper left drawing of FIG. 10, the item for input switching is focused, as shown in FIG. 11.

In a state in which the item for input switching is focused, when the right-arrow key 94 or the select key 95 of the remote controller 67 is pressed, the item for input switching is selected. Thus, the screen showing the GUI images shown in FIG. 11 is changed to the screen showing GUI images shown in FIG. 12, which corresponds to the second drawing from the top on the left of FIG. 10.

Figure 12:
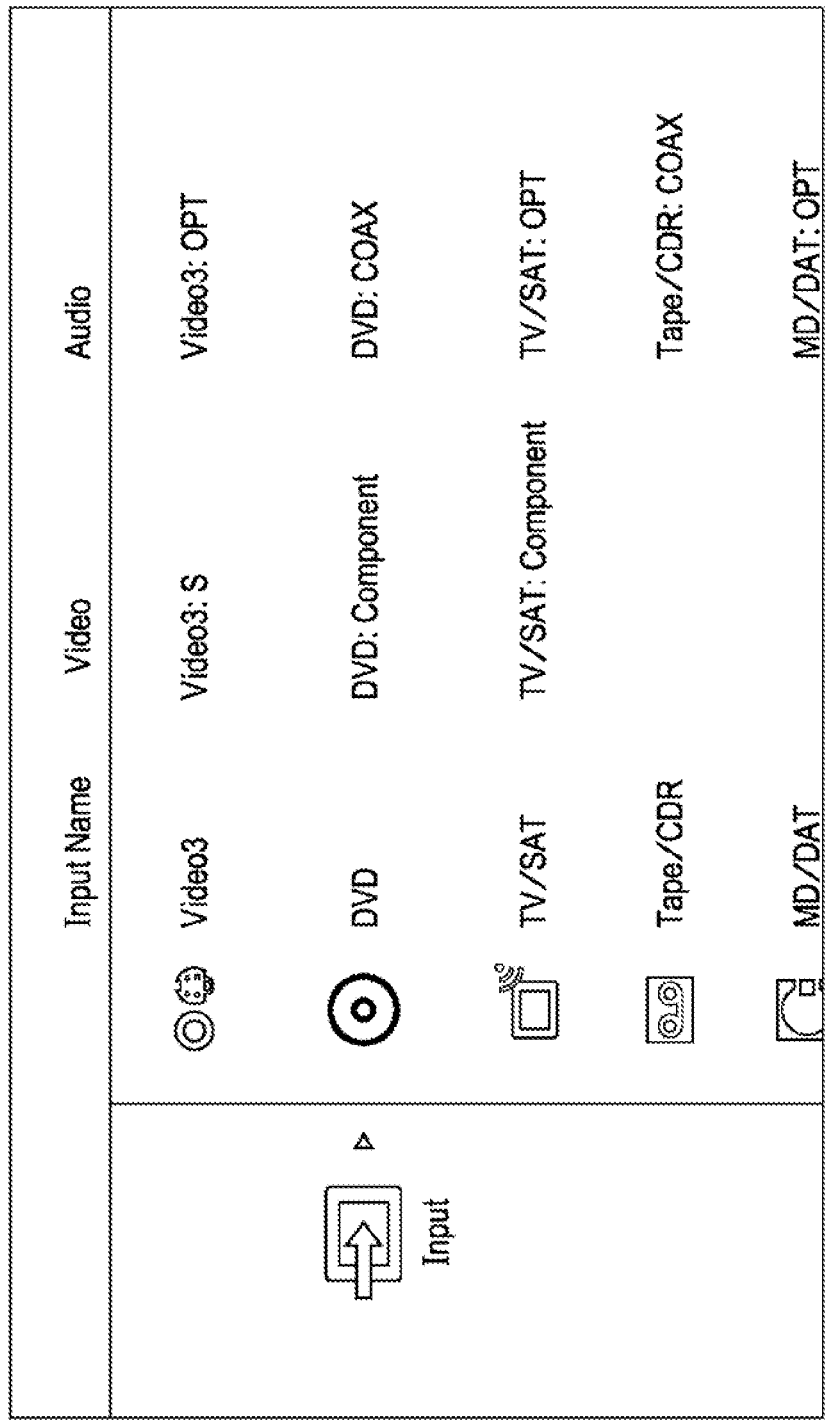
FIG. 12 is an illustration for explaining GUI images.

As shown in FIG. 12, on the left of the screen, only the selected item for input switching among the items at the highest hierarchical level is displayed. To the right of the item for input switching, input names, each representing a unit of an input to be selected by the user, of child items of the item for input switching among items at the second highest hierarchical level are displayed. To the right of the input names, names of input terminals assigned to the input names are displayed.

Figure 13:
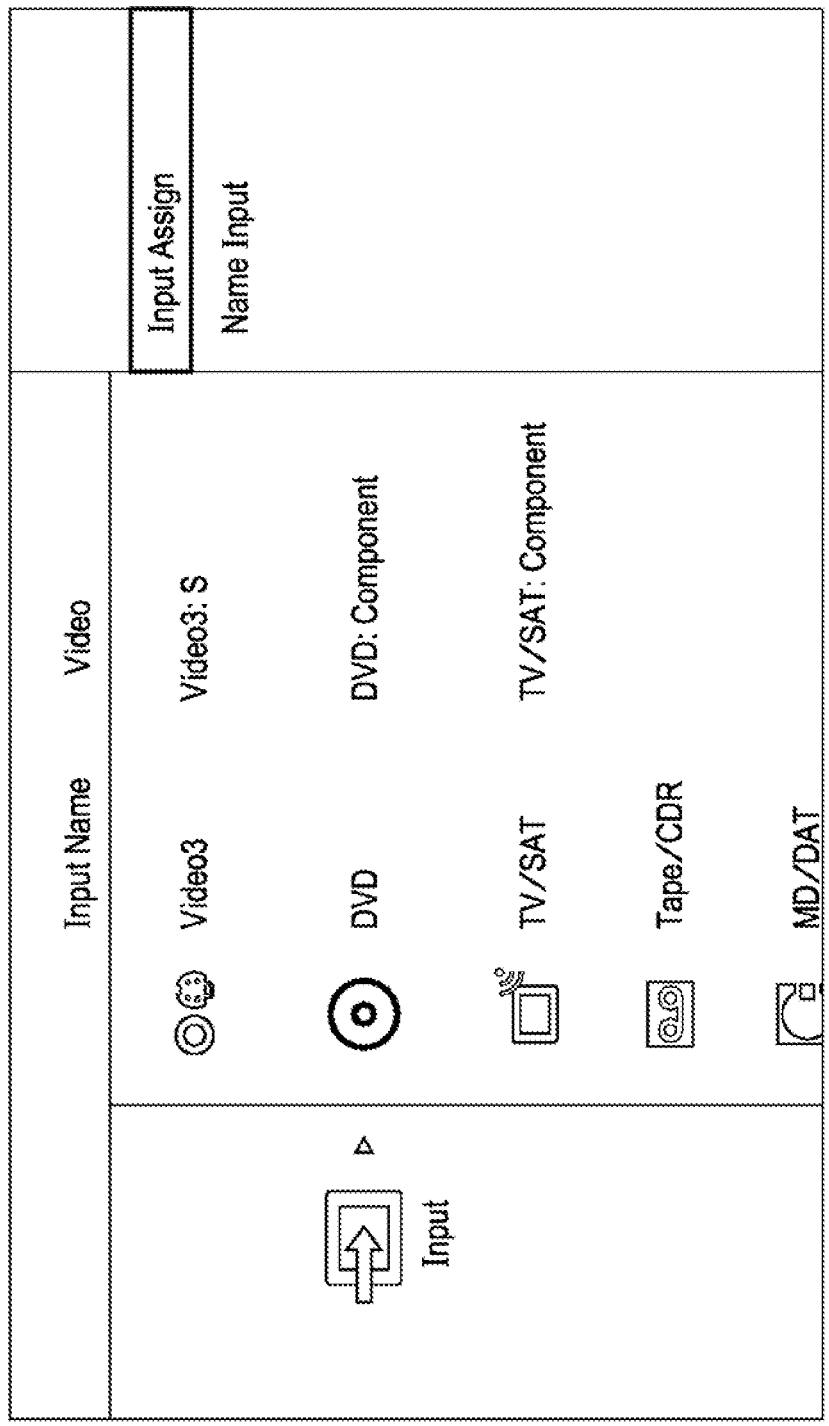
FIG. 13 is an illustration for explaining GUI images.

For example, in a state in which the item "DVD" among input names is focused, when the key 96, which is used for instructing to display an option menu, of the remote controller 67 is pressed, an option menu is displayed, as shown in FIG. 13, which corresponds to the third drawing from the top on the left of FIG. 10. In this case, as items of the option menu, an item described as "Input Assign" for assigning an input terminal to an input name, an item described as "Name Input" for editing an input name, and the like are provided.

Figure 14:
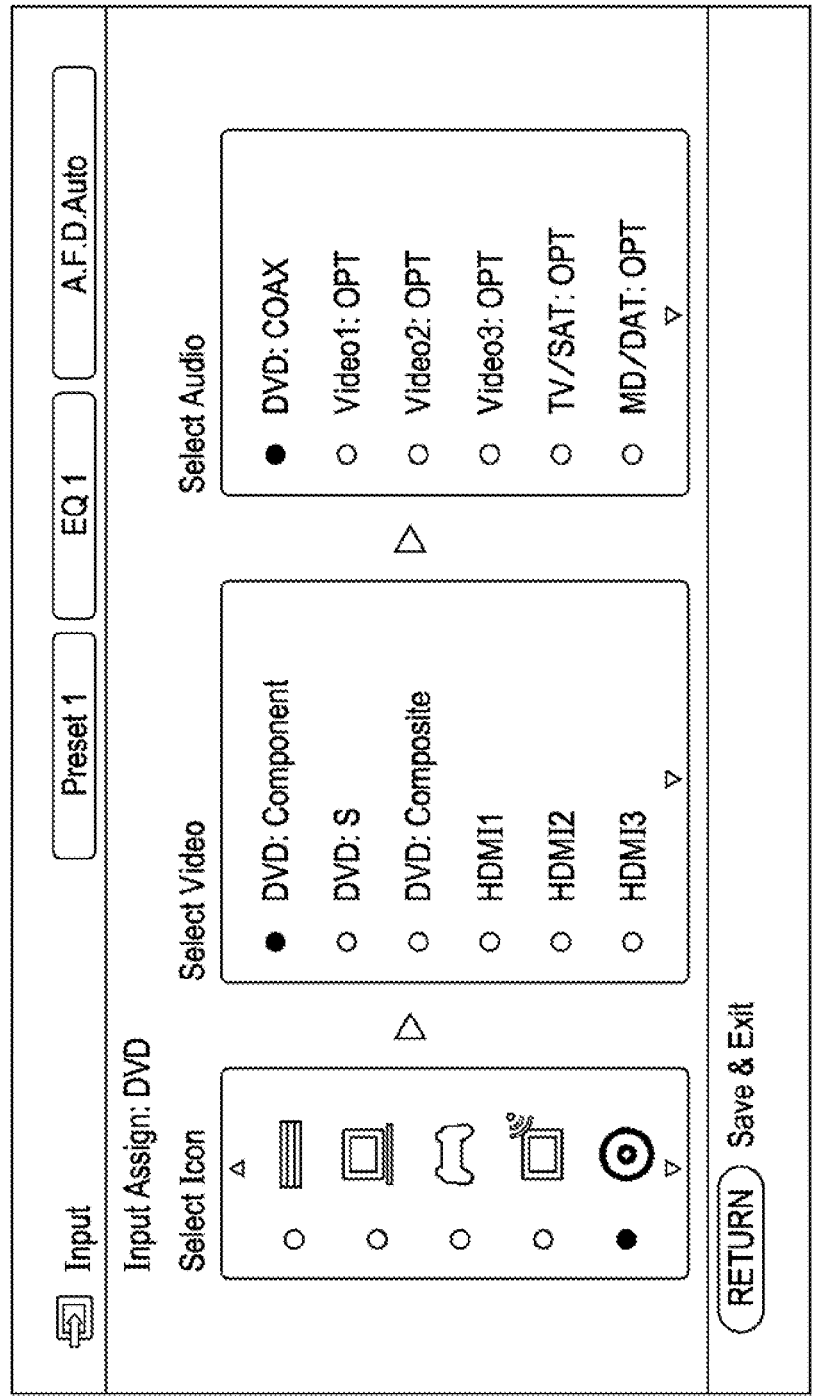
FIG. 14 is an illustration for explaining GUI images.

In a state in which the item for assigning an input terminal to an input name among items of the option menu is focused, as shown in FIG. 13, when the select key 95 of the remote controller 67 is pressed, the screen showing the GUI images shown in FIG. 13 is changed to the screen shown in FIG. 14, which corresponds to the upper right drawing of FIG. 10, showing GUI images used for assigning an input terminal to the input name of the item "DVD".

On the screen showing the GUI images for assigning an input terminal to the input name of the item "DVD", letters "Input Assign:DVD" indicating an input name to which assigning of an input terminal is to be performed are displayed in an upper portion of the screen.

On the screen showing the GUI images used for assigning an input terminal to the input name of the item "DVD", on the left of the screen, items for selecting an icon provided together with an input name are disposed so as to be aligned in the vertical direction. To the right of the items for selecting an icon, items for selecting one of the input terminals 21-1 to 21-*n* or one of the input terminals 25-1 to 25-*m* that is assigned to the input name and that receives a video signal, are disposed so as to be aligned in the vertical direction.

To the right of the items for selecting one of the input terminals 21-1 to 21-*n* or one of the input terminals 25-1 to 25-*m* that is assigned to the input name and that receives a video signal, that is, to the right of the GUI images for assigning an input terminal to the input name of the item "DVD", items for selecting one of the input terminals 29-1 to 29-*p* or one of the input terminals 33-1 to 33-*q* that is assigned to the input name and that receives an audio signal are disposed so as to be aligned in the vertical direction.

A circle indicating selection of an item is provided for each of the items for selecting an icon provided together with an input name. A white circle indicates that a corresponding item is not selected, and a black circle indicates that a corresponding item is selected.

When the screen showing the GUI images used for assigning an input terminal to an input name is reached, a circle provided for an item for selecting the currently selected item is displayed in black so that the user can recognize that the icon is currently selected. In addition, when the screen showing the GUI images used for assigning an input terminal to the input name is reached, the item for selecting the currently selected icon among items for selecting an icon provided together with an input name is focused.

In the example shown in FIG. 14, since an icon illustrating an optical disk is currently selected as an icon displayed together with the input name of the item "DVD", a circle provided for an item for selecting the icon illustrating an optical disk is displayed in black.

In addition, when the screen showing the GUI images used for assigning an input terminal to the input name is reached, the item for selecting the icon illustrating an optical disk is focused.

In addition, a circle indicating selection of an item is provided for each of the items for selecting one of the input terminals 21-1 to 21-*n* or one of the input terminals 25-1 to 25-*m* that is assigned to the input name and that receives a video signal. A white circle indicates that a corresponding item is not selected, and a black circle indicates that a corresponding item is selected.

When the screen showing the GUI images used for assigning an input terminal to the input name is reached, a circle provided for an item for selecting an input terminal that is currently assigned to the input name and that receives a video signal is displayed in black so that the user can recognize the input terminal.

In the example shown in FIG. 14, since an input terminal having the name "DVD:Component" among the input terminals 21-1 to 21-*n* or the input terminals 25-1 to 25-*m* is assigned to the input name of the item "DVD", a circle provided for an item for selecting the input terminal having the name "DVD:Component" is displayed in black.

In addition, a circle indicating selection of an item is provided for each of the items for selecting one of the input terminals 29-1 to 29-*p* or one of the input terminals 33-1 to 33-*q* that is assigned to the input name and that receives an audio signal. A white circle indicates that a corresponding item is not selected, and a black circle indicates that a corresponding item is selected.

When the screen showing the GUI images used for assigning an input terminal to the input name is reached, a circle provided for an item for selecting an input terminal that is currently assigned to the input name and that receives an audio signal is displayed in black so that the user can recognize the input terminal.

In the example shown in FIG. 14, since an input terminal having the name "DVD:COAX" among the input terminals 29-1 to 29-*p* or the input terminals 33-1 to 33-*q* is assigned to the input name of the item "DVD", a circle provided for an item for selecting the input terminal having the name "DVD:COAX" is displayed in black.

Figure 15:
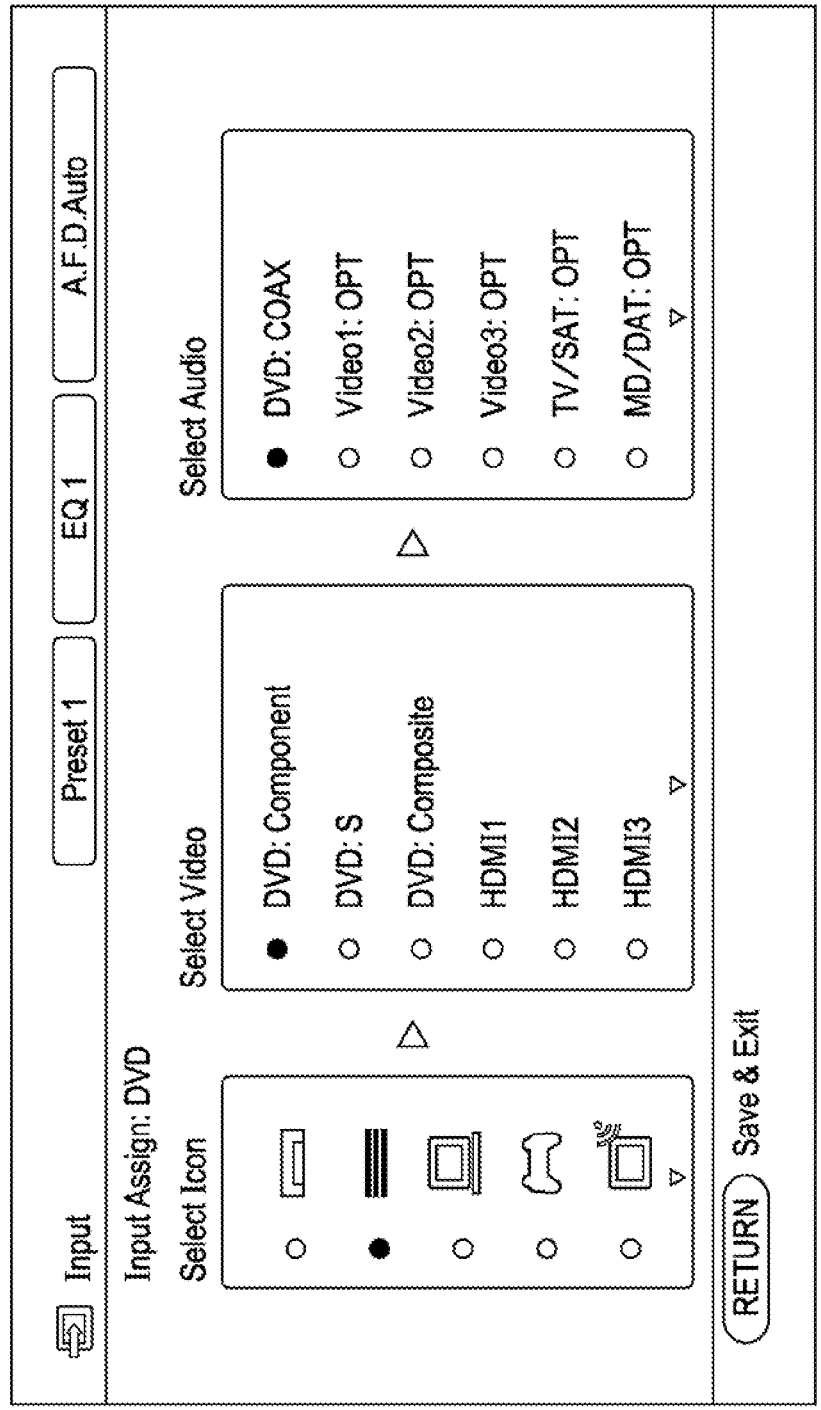
FIG. 15 is an illustration for explaining GUI images.

In a state in which the item for selecting the icon illustrating an optical disk is focused, for example, when the up-arrow key 91 of the remote controller 67 is pressed four times, an item for selecting an icon illustrating three stacked horizontally long rectangles, which is the fourth item up from the item for selecting the icon illustrating an optical disk, is focused, as shown in FIG. 15, which corresponds to the second drawing from the top on the right of FIG. 10.

In the state in which the item for selecting the icon illustrating three stacked horizontally long rectangles is focused, when the select key 95 of the remote controller 67 is pressed, the item for selecting the icon illustrating three stacked horizontally long rectangles is selected. Thus, as an icon displayed together with an input name, the icon illustrating three stacked horizontally long rectangles is selected.

In addition, when the right-arrow key 94 of the remote controller 67 is pressed, an item for selecting one of the input terminals 21-1 to 21-*n* or one of the input terminals 25-1 to 25-*m* that is assigned to the input name and that receives a video signal is focused. More specifically, since an input terminal having the name "DVD:Component" is currently assigned to the input name, an item for selecting the input terminal having the name "DVD:Component" is focused.

Figure 16:
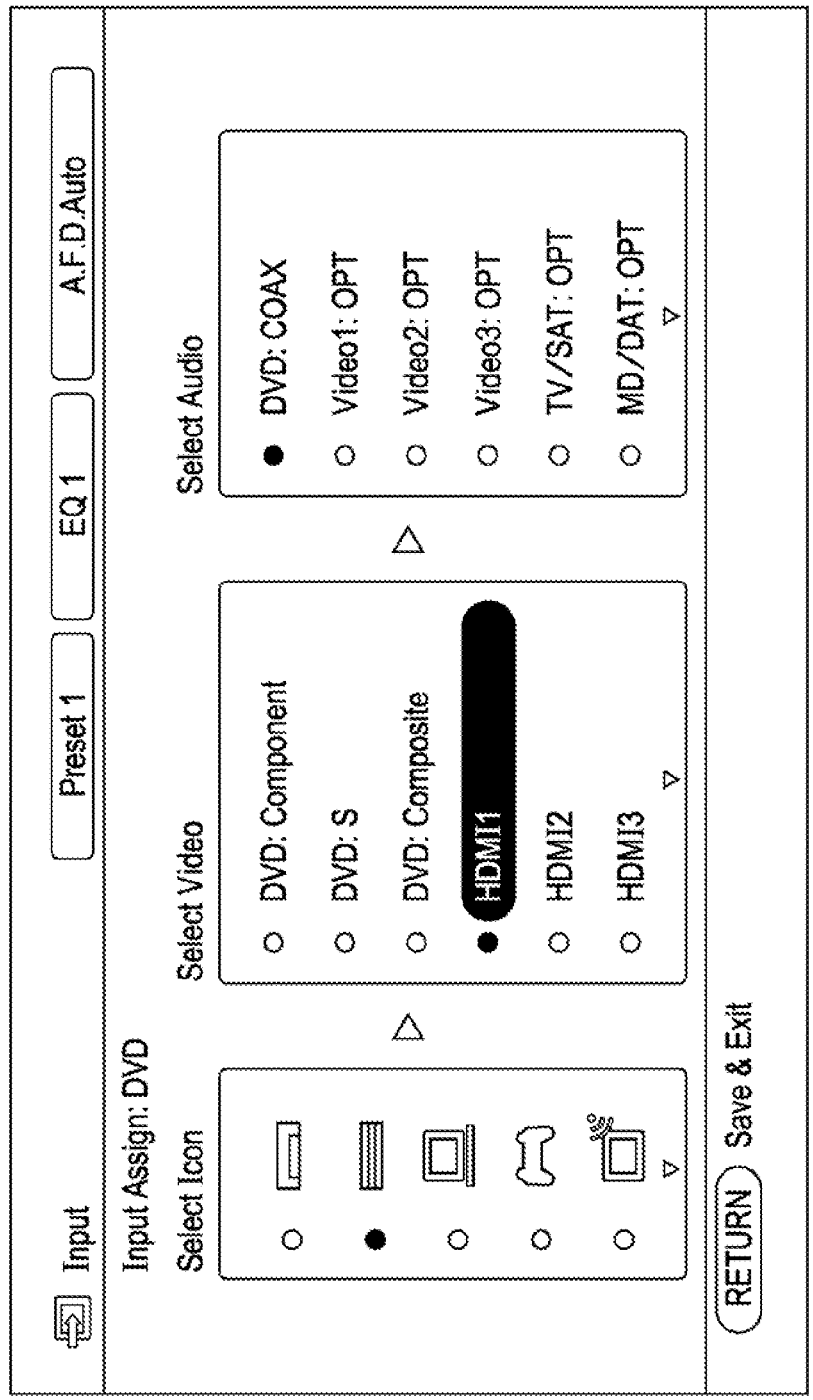
FIG. 16 is an illustration for explaining GUI images.

In the state in which the item for selecting the input terminal having the name "DVD:Component" is focused, for example, when the down-arrow key 92 of the remote controller 67 is pressed three times, an item for selecting an input terminal having a name "HDMI1", which is the third item down from the item for selecting the input terminal having the name "DVD:Component", is focused, as shown in FIG. 16, which corresponds to the third drawing from the top on the right of FIG. 10.

In the state in which the item for selecting the input terminal having the name "HDMI1" is focused, when the select key 95 of the remote controller 67 is pressed, the item for selecting the input terminal having the name "HDMI1" is selected. Thus, the input terminal having the name "HDMI1" among the input terminals 21-1 to 21-*n* or the input terminals 25-1 to 25-*m* for receiving video signals is assigned to the input name "DVD".

In addition, when the right-arrow key 94 of the remote controller 67 is pressed, an item for selecting one of the input terminals 29-1 to 29-*p* or one of the input terminals 33-1 to 33-*q* that is assigned to the input name and that receives an audio signal is focused. More specifically, since an input terminal having the name "DVD:COAX" is currently assigned to the input name, an item for selecting the input terminal having the name "DVD:COAX" is focused.

Figure 17:
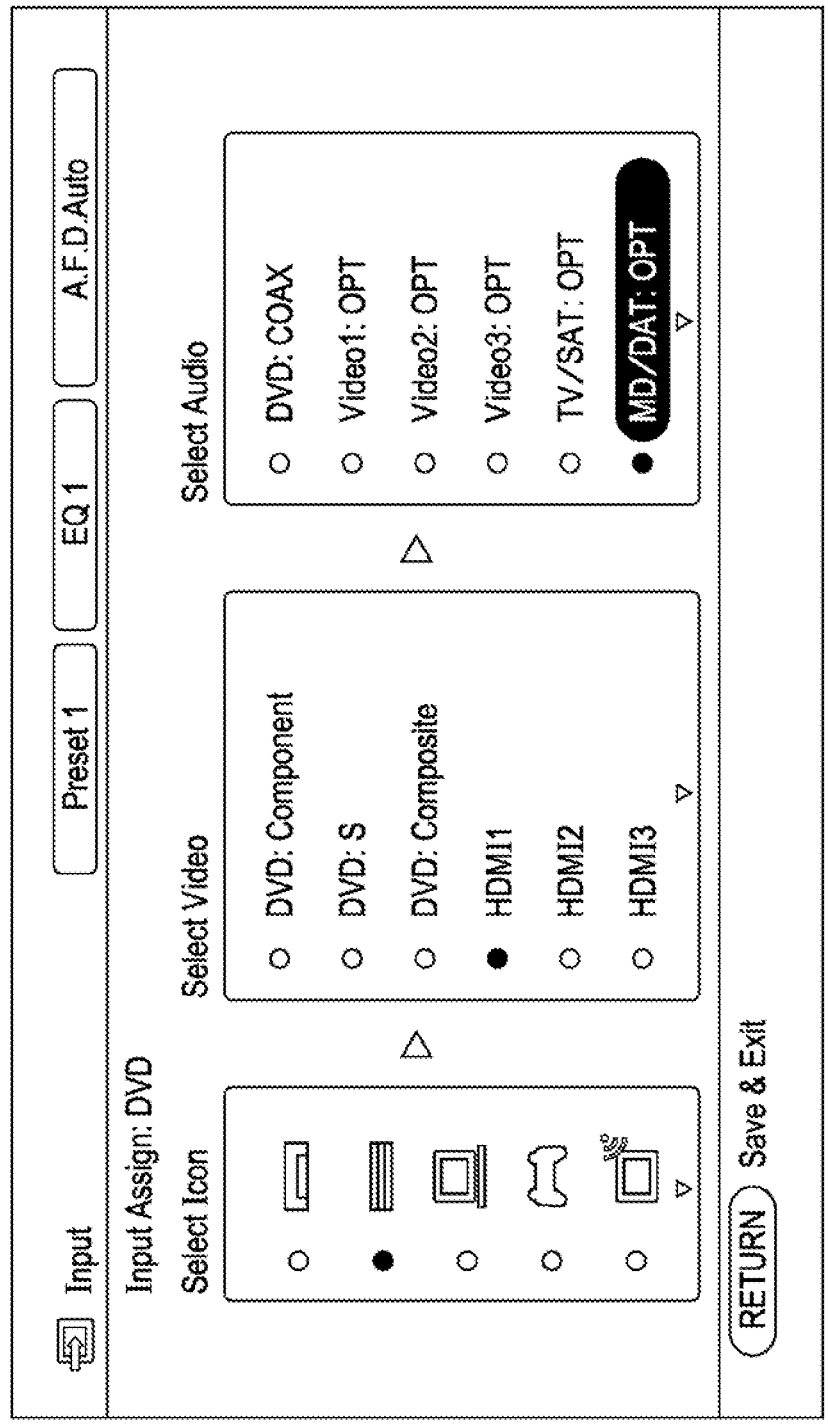
FIG. 17 is an illustration for explaining GUI images.

In the state in which the item for selecting the input terminal having the name "DVD:COAX" is focused, for example, when the down-arrow key 92 of the remote controller 67 is pressed five times, an item for selecting an input terminal having a name "MD/DAT:OPT", which is the fifth item down from the item for selecting the input terminal having the name "DVD:COAX", is focused, as shown in FIG. 17, which corresponds to the fourth drawing from the top on the right of FIG. 10.

In the state in which the item for selecting the input terminal having the name "MD/DAT:OPT" is selected, when the select key 95 of the remote controller 67 is pressed, the item for selecting the input terminal having the name "MD/DAT:OPT" is selected. Thus, the input terminal having the name "MD/DAT:OPT" among the input terminals 29-1 to 29-p or the input terminals 33-1 to 33-q for receiving audio signals is assigned to the input name "DVD".

Figure 18:
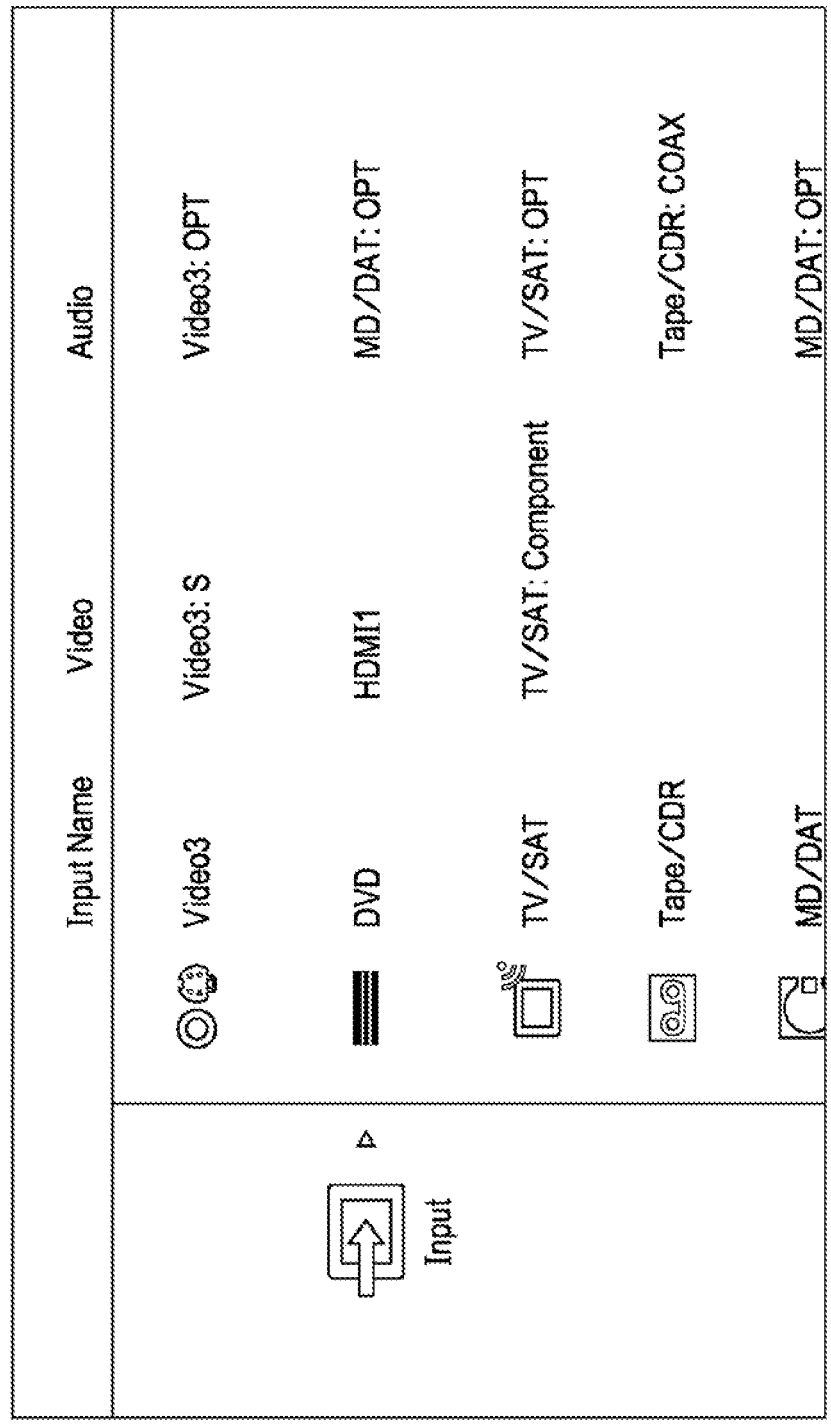
FIG. 18 is an illustration for explaining GUI images.

When the return key 97 of the remote controller 67 is pressed, the screen showing GUI images shown in FIG. 18, which corresponds to the fifth drawing from the top on the right of FIG. 10, is reached. As shown in FIG. 18, on the left of the screen, only the selected item for input switching among the items at the highest hierarchical level is displayed. To the right of the item for input switching, the item "DVD", which is an input name representing a unit of an input selected by the user, is displayed together with an icon illustrating three stacked horizontally long rectangles. To the right of the input name, the name "HDMI1" of the input terminal that is assigned to the input name and that receives a video signal is displayed. To the right of the name "HDMI1", the name "MD/DAT:OPT" of the input name that is assigned to the input name and that receives an audio signal is displayed.

That is, the assigning unit 103 assigns the icon illustrating three stacked horizontally long rectangles, the input terminal having the name "HDMI1" among input terminals for receiving video signals, and the input terminal having the name "MD/DAT:OPT" among input terminals for receiving audio signals to the display name "DVD".

As described above, one of the input terminals 21-1 to 21-n or one of the input terminals 25-1 to 25-m for receiving video signals and one of the input terminals 29-1 to 29-p or one of the input terminals 33-1 to 33-q for receiving audio signals can be easily assigned to an input name.

As shown in FIG. 19, an input terminal that can be assigned to an input name is determined in advance.

For example, as an input terminal for receiving a video signal, one of a pin jack having the name "VIDEO1" for receiving a composite signal, an S terminal having the name "VIDEO1", a pin jack having the name "VIDEO1" for receiving a component signal, a pin jack having the name "DVD" for receiving a component signal, a pin jack having the name "TV/SAT" for receiving a component signal, an HDMI terminal having the name "HDMI1", and an HDMI terminal having the name "HDMI2" is assigned to the input name "VIDEO1".

As an input terminal for receiving an audio signal, one of a pin jack having the name "VIDEO1" for receiving an analog signal, a receptacle having the name "VIDEO1" for connecting an optical cable, and a receptacle having the name "VIDEO1" for connecting a coaxial cable is assigned to the input name "VIDEO1".

When an input terminal, which is an HDMI terminal, for receiving a video signal is assigned an input name, a video signal and an audio signal are input to the HDMI terminal. Thus, assigning of an input terminal for receiving an audio signal to the input name can be omitted.

As an input terminal for receiving a video signal, one of a pin jack having the name "VIDEO2" for receiving a composite signal, an S terminal having the name "VIDEO2", a pin jack having the name "DVD" for receiving a component signal, a pin jack having the name "TV/SAT" for receiving a component signal, an HDMI terminal having the name "HDMI1", and an HDMI terminal having the name "HDMI2" is assigned to the input name "VIDEO2".

As an input terminal for receiving an audio signal, one of a pin jack having the name "VIDEO2" for receiving an analog signal, a receptacle having the name "VIDEO1" for connecting an optical cable, a receptacle having the name "VIDEO1" for connecting a coaxial cable, a receptacle having the name "VIDEO5" for connecting an optical cable, a receptacle having the name "DVD" for connecting an optical cable, a receptacle having the name "DVD" for connecting a coaxial cable, a receptacle having the name "LD" for connecting an optical cable, a receptacle having the name "LD" for connecting a coaxial cable, a receptacle having the name "TV/SAT" for connecting an optical cable, a receptacle having the name "TV/SAT" for connecting a coaxial cable, a receptacle having the name "MD/DAT" for connecting an optical cable, a receptacle having the name "CD/SA-CD" for connecting an optical cable, and a receptacle having the name "CD/SA-CD" for connecting a coaxial cable is assigned to the input name "VIDEO2".

As an input terminal for receiving a video signal, one of a pin jack having the name "VIDEO3" for receiving a composite signal, an S terminal having the name "VIDEO3", a pin jack having the name "DVD" for receiving a component signal, a pin jack having the name "TV/SAT" for receiving a component signal, an HDMI terminal having the name "HDMI1", and an HDMI terminal having the name "HDMI2" is assigned to the input name "VIDEO3".

As an input terminal for receiving an audio signal, one of a pin jack having the name "VIDEO3" for receiving an analog signal, a receptacle having the name "VIDEO1" for connecting an optical cable, a receptacle having the name "VIDEO1" for connecting a coaxial cable, a receptacle having the name "VIDEO5" for connecting an optical cable, a receptacle having the name "DVD" for connecting an optical cable, a receptacle having the name "DVD" for connecting a coaxial cable, a receptacle having the name "LD" for connecting an optical cable, a receptacle having the name "LD" for connecting a coaxial cable, a receptacle having the name "TV/SAT" for connecting an optical cable, a receptacle having the name "TV/SAT" for connecting a coaxial cable, a receptacle having the name "MD/DAT" for connecting an optical cable, a receptacle having the name "CD/SA-CD" for connecting an optical cable, and a receptacle having the name "CD/SA-CD" for connecting a coaxial cable is assigned to the input name "VIDEO3".

As an input terminal for receiving a video signal, one of a pin jack having the name "VIDEO4" for receiving a composite signal, an S terminal having the name "VIDEO4", a pin jack having the name "DVD" for receiving a component signal, a pin jack having the name "TV/SAT" for receiving a component signal, an HDMI terminal having the name "HDMI1", and an HDMI terminal having the name "HDMI2" is assigned to the input name "VIDEO4".

As an input terminal for receiving an audio signal, one of a pin jack having the name "VIDEO4" for receiving an analog signal, a receptacle having the name "VIDEO1" for connecting an optical cable, a receptacle having the name "VIDEO1" for connecting a coaxial cable, a receptacle having the name "VIDEO5" for connecting an optical cable, a receptacle having the name "DVD" for connecting an optical cable, a receptacle having the name "DVD" for connecting a coaxial cable, a receptacle having the name "LD" for connecting an optical cable, a receptacle having the name "LD" for connecting a coaxial cable, a receptacle having the name "TV/SAT" for connecting an optical cable, a receptacle having the name "TV/SAT" for connecting a coaxial cable, a receptacle having the name "MD/DAT" for connecting an optical cable, a receptacle having the name "CD/SA-CD" for connecting an optical cable, and a receptacle having the name "CD/SA-CD" for connecting a coaxial cable is assigned to the input name "VIDEO4".

As an input terminal for receiving a video signal, one of a pin jack having the name "VIDEO5" for receiving a composite signal, an S terminal having the name "VIDEO5", a pin jack having the name "DVD" for receiving a component signal, a pin jack having the name "TV/SAT" for receiving a component signal, an HDMI terminal having the name "HDMI1", and an HDMI terminal having the name "HDMI2" is assigned to the input name "VIDEO5".

As an input terminal for receiving an audio signal, one of a pin jack having the name "VIDEO5" for receiving an analog signal and a receptacle having the name "VIDEO5" for connecting an optical cable is assigned to the input name "VIDEO5".

As an input terminal for receiving a video signal, one of a pin jack having the name "DVD" for receiving a component signal, a pin jack having the name "TV/SAT" for receiving a component signal, an HDMI terminal having the name "HDMI1", and an HDMI terminal having the name "HDMI2" is assigned to the input name "DVD".

As an input terminal for receiving an audio signal, one of a pin jack having the name "DVD" for receiving an analog signal, a receptacle having the name "DVD" for connecting an optical cable, and a receptacle having the name "DVD" for connecting a coaxial cable is assigned to the input name "DVD".

As an input terminal for receiving a video signal, one of a pin jack having the name "LD" for receiving a composite signal, an S terminal having the name "LD", a pin jack having the name "DVD" for receiving a component signal, a pin jack having the name "TV/SAT" for receiving a component signal, an HDMI terminal having the name "HDMI1", and an HDMI terminal having the name "HDMI2" is assigned to the input name "LD".

As an input terminal for receiving an audio signal, one of a pin jack having the name "LD" for receiving an analog signal and a receptacle having the name "LD" for connecting an optical cable is assigned to the input name "LD".

As an input terminal for receiving a video signal, one of a pin jack having the name "TV/SAT" for receiving a composite signal, an S terminal having the name "TV/SAT", a pin jack having the name "TV/SAT" for receiving a component signal, and an HDMI terminal having the name "HDMI2" is assigned to the input name "TV/SAT".

As an input terminal for receiving an audio signal, one of a pin jack having the name "TV/SAT" for receiving an analog signal, a receptacle having the name "TV/SAT" for connecting an optical cable, and a receptacle having the name "TV/SAT" for connecting a coaxial cable is assigned to the input name "TV/SAT".

As an input terminal for receiving a video signal, no terminal or one of a pin jack having the name "DVD" for receiving a component signal, a pin jack having the name "TV/SAT" for receiving a component signal, an HDMI terminal having the name "HDMI1", and an HDMI terminal having the name "HDMI2" is assigned to the input name "CD/SA-CD".

As an input terminal for receiving an audio signal, one of a pin jack having the name "CD/SA-CD" for receiving an analog signal and a receptacle having the name "CD/SA-CD" for connecting an optical cable is assigned to the input name "CD/SA-CD".

As an input terminal for receiving a video signal, no terminal or one of a pin jack having the name "DVD" for receiving a component signal, an pin jack having the name "TV/SAT" for receiving a component signal, an HDMI terminal having the name "HDMI1", and an HDMI terminal having the name "HDMI2" is assigned to the input name "MD/DAT".

As an input terminal for receiving an audio signal, one of a pin jack having the name "MD/DAT" for receiving an analog signal and a receptacle having the name "MD/DAT" for connecting an optical cable is assigned to the input name "MD/DAT".

As an input terminal for receiving a video signal, no terminal or one of a pin jack having the name "DVD" for receiving a component signal, a pin jack having the name "TV/SAT" for receiving a component signal, an HDMI terminal having the name "HDMI1", and an HDMI terminal having the name "HDMI2" is assigned to the input name "TAPE".

As an input terminal for receiving an audio signal, one of a pin jack having the name "TAPE" for receiving an analog signal, a receptacle having the name "VIDEO1" for connecting an optical cable, a receptacle having the name "VIDEO1" for connecting a coaxial cable, a receptacle having the name "VIDEO5" for connecting an optical cable, a receptacle having the name "DVD" for connecting an optical cable, a receptacle having the name "DVD" for connecting a coaxial cable, a receptacle having the name "LD" for connecting an optical cable, a receptacle having the name "LD" for connecting a coaxial cable, a receptacle having the name "TV/SAT" for connecting an optical cable, a receptacle having the name "TV/SAT" for connecting a coaxial cable, a receptacle having the name "MD/DAT" for connecting an optical cable, a receptacle having the name "CD/SA-CD" for connecting an optical cable, and a receptacle having the name "CD/SA-CD" for connecting a coaxial cable is assigned to the input name "TAPE".

As an input terminal for receiving a video signal, no terminal is assigned to the input name "TUNER". As an input terminal for receiving an audio signal, one of a pin jack having the name "TUNER PACK" for receiving an analog signal, a receptacle having the name "VIDEO1" for connecting an optical cable, a receptacle having the name "VIDEO1" for connecting a coaxial cable, a receptacle having the name "VIDEO5" for connecting an optical cable, a receptacle having the name "DVD" for connecting an optical cable, a receptacle having the name "DVD" for connecting a coaxial cable, a receptacle having the name "LD" for connecting an optical cable, a receptacle having the name "LD" for connecting a coaxial cable, a receptacle having the name "TV/SAT" for connecting an optical cable, a receptacle having the name "TV/SAT" for connecting a coaxial cable, a receptacle having the name "MD/DAT" for connecting an optical cable, a receptacle having the name "CD/SA-CD" for connecting an optical cable, and a receptacle having the name "CD/SA-CD" for connecting a coaxial cable is assigned to the input name "TUNER".

As shown in FIG. 20, an input terminal that can be assigned to an input name can be determined in advance.

For example, as an input terminal for receiving a video signal, one of a pin jack having the name "Video1" for receiving a composite signal, an S terminal having the name "Video1", a pin jack having the name "Video1" for receiving a component signal, an HDMI terminal having the name "HDMI1", an HDMI terminal having the name "HDMI2", and an HDMI terminal having the name "HDMI3" is assigned to the input name "VIDEO1".

As an input terminal for receiving an audio signal, one of a receptacle having the name "Video1" for connecting an optical cable, a receptacle having the name "DVD" for connecting a coaxial cable, a receptacle having the name "TAPE/CD-R" for connecting a coaxial cable, and a receptacle having the name "SA-CD/CD" for connecting a coaxial cable is assigned to the input name "VIDEO1".

As an input terminal for receiving a video signal, one of a pin jack for having the name "Video1" for receiving a component signal, a pin jack having the name "Video2" for receiving a composite signal, an S terminal having the name "Video2", a pin jack having the name "DVD" for receiving a component signal, a pin jack having the name "TV/SAT" for receiving a component signal, an HDMI terminal having the name "HDMI1", an HDMI terminal having the name "HDMI2", and an HDMI terminal having the name "HDMI3" is assigned to the input name "VIDEO2".

As an input terminal for receiving an audio signal, one of a receptacle having the name "Video2" for connecting an optical cable, a receptacle having the name "DVD" for connecting a coaxial cable, a receptacle having the name "TAPE/CD-R" for connecting a coaxial cable, and a receptacle having the name "SA-CD/CD" for connecting a coaxial cable is assigned to the input name "VIDEO2".

As an input terminal for receiving a video signal, one of a pin jack having the name "Video1" for receiving a component signal, a pin jack having the name "Video3" for receiving a composite signal, an S terminal having the name "Video3", a pin jack having the name "DVD" for receiving a component signal, a pin jack having the name "TV/SAT" for receiving a component signal, an HDMI terminal having the name "HDMI1", an HDMI terminal having the name "HDMI2", and an HDMI terminal having the name "HDMI3" is assigned to the input name "VIDEO3".

As an input terminal for receiving an audio signal, one of a receptacle having the name "Video3" for connecting an optical cable, a receptacle having the name "DVD" for connecting a coaxial cable, a receptacle having the name "TAPE/CD-R" for connecting a coaxial cable, and a receptacle having the name "SA-CD/CD" for connecting a coaxial cable is assigned to the input name "VIDEO3".

As an input terminal for receiving a video signal, one of a pin jack having the name "DVD" for receiving a composite signal, an S terminal having the name "DVD", a pin jack having the name "DVD" for receiving a component signal, an HDMI terminal having the name "HDMI1", an HDMI terminal having the name "HDMI2", and an HDMI terminal having the name "HDMI3" is assigned to the input name "DVD".

An input terminal for receiving an audio signal, one of a receptacle having the name "TV/SAT" for connecting an optical cable, a receptacle having the name "DVD" for connecting a coaxial cable, a receptacle having the name "TAPE/CD-R" for connecting a coaxial cable, and a receptacle having the name "SA-CD/CD" for connecting a coaxial cable is assigned to the input name "DVD".

As an input terminal for receiving a video signal, one of a pin jack having the name "TV/SAT" for receiving a composite signal, an S terminal having the name "TV/SAT", a pin jack having the name "TV/SAT" for receiving a component signal, an HDMI terminal having the name "HDMI1", an HDMI terminal having the name "HDMI2", and an HDMI terminal having the name "HDMI3" is assigned to the input name "TV/SAT".

As an input terminal for receiving an audio signal, one of a receptacle having the name "MD/DAT" for connecting an optical cable, a receptacle having the name "DVD" for connecting a coaxial cable, a receptacle having the name "TAPE/CD-R" for connecting a coaxial cable, and a receptacle having the name "SA-CD/CD" for connecting a coaxial cable is assigned to the input name "TV/SAT".

As an input terminal for receiving a video signal, one of a pin jack having the name "Video1" for receiving a component signal, a pin jack having the name "DVD" for receiving a component signal, a pin jack having the name "DVD" for receiving a composite signal, an HDMI terminal having the name "HDMI1", an HDMI terminal having the name "HDMI2", and an HDMI terminal having the name "HDMI3" is assigned to the input name "TAPE/CD-R".

As an input terminal for receiving an audio signal, one of a receptacle having the name "Video1" for connecting an optical cable, a receptacle having the name "Video2" for connecting an optical cable, a receptacle having the name "Video3" for connecting an optical cable, a receptacle having the name "TV/SAT" for connecting an optical cable, a receptacle having the name "MD/DAT" for connecting an optical cable, and a receptacle having the name "DVD" for connecting a coaxial cable is assigned to the input name "TAPE/CD-R".

As an input terminal for receiving a video signal, one of a pin jack having the name "Video1" for receiving a component signal, a pin jack having the name "DVD" for receiving a component signal, a pin jack having the name "DVD" for receiving a composite signal, an HDMI terminal having the name "HDMI1", an HDMI terminal having the name "HDMI2", and an HDMI terminal having the name "HDMI3" is assigned to the input name "MD/DAT".

As an input terminal for receiving an audio signal, one of a receptacle having the name "Video1" for connecting an optical cable, a receptacle having the name "Video2" for connecting an optical cable, a receptacle having the name "Video3" for connecting an optical cable, a receptacle having the name "TV/SAT" for connecting an optical cable, a receptacle having the name "MD/DAT" for connecting an optical cable, and a receptacle having the name "TAPE/CD-R" for connecting a coaxial cable is assigned to the input name "MD/DAT".

As an input terminal for receiving a video signal, one of a pin jack having the name "Video1" for receiving a component signal, a pin jack having the name "DVD" for receiving a component signal, a pin jack having the name "DVD" for receiving a composite signal, an HDMI terminal having the name "HDMI1", an HDMI terminal having the name "HDMI2", and an HDMI terminal having the name "HDMI3" is assigned to the input name "SA-CD/CD".

As an input terminal for receiving an audio signal, one of a receptacle having the name "Video1" for connecting an optical cable, a receptacle having the name "Video2" for connecting an optical cable, a receptacle having the name "Video3" for connecting an optical cable, a receptacle having the name "TV/SAT" for connecting an optical cable, a receptacle having the name "MD/DAT" for connecting an optical cable, and a receptacle having the name "SA-CD/CD" for connecting a coaxial cable is assigned to the input name "SA-CD/CD".

Processing for editing an input name will be described with reference to FIGS. 21 to 25.

Figure 21:
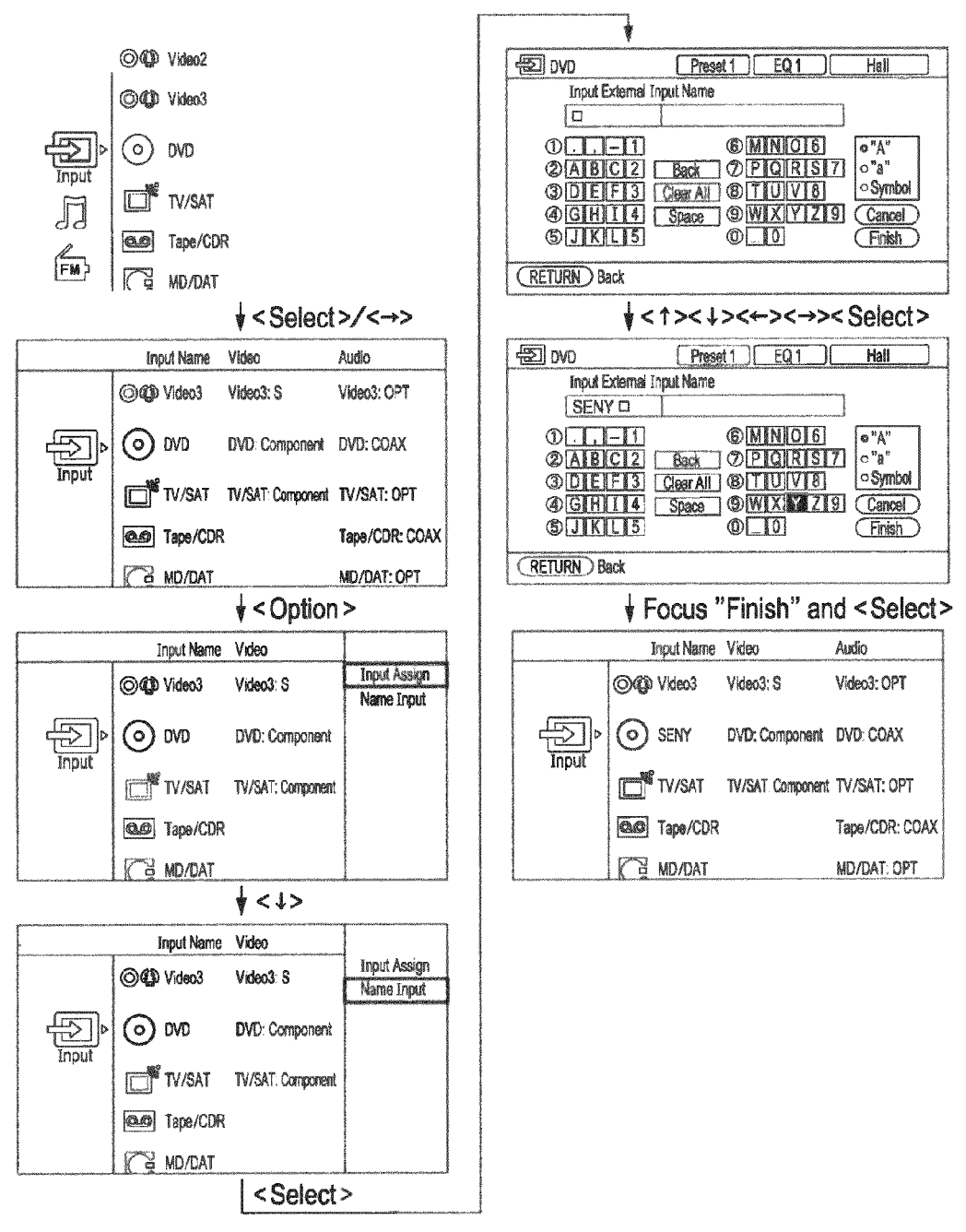

FIG. 21 illustrates transition of GUI images used for processing for editing an input name. The GUI images used for the processing for editing an input name correspond to the Name Input screen.

In a state shown in the upper left drawing of FIG. 21, an item for input switching is focused.

In the state in which the item for input switching is focused, when the right-arrow key 94 or the select key 95 of the remote controller 67 is pressed, the item for input switching is selected. Thus, a state shown in the second drawing from the top on the left of FIG. 21 is reached. On the left of the screen, only the selected item for input switching among the items at the highest hierarchical level is displayed. To the right of the item for input switching, input names, each representing a unit of an input to be selected by the user, of child items of the item for input switching among items at the second highest hierarchical level are displayed. To the right of the input names, names of input terminals assigned to the input names are displayed.

For example, in a state in which the item "DVD" is focused, when the key 96, which is used for instructing to display an option menu, of the remote controller 67 is pressed, a state shown in the third drawing from the top on the left of FIG. 21 is reached and an option menu is displayed. In this case, as items of the option menu, an item for assigning an input terminal to an input name, an item for editing an input name, and the like are provided. When the option menu is displayed, the item for assigning an input terminal to an input name among items of the option menu is focused.

Figure 22:
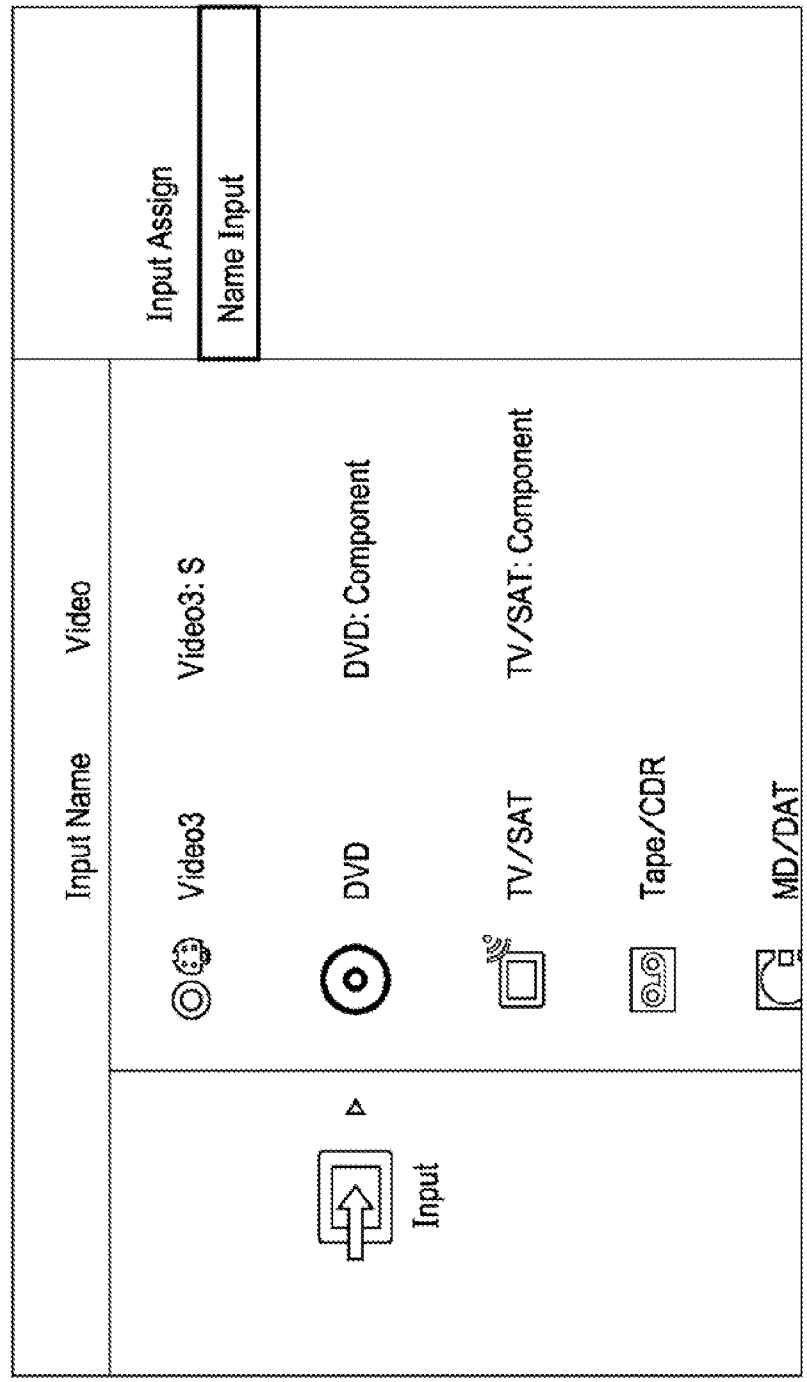
FIG. 22 is an illustration for explaining GUI images.

In the state in which the item for assigning an input terminal to an input name is focused, when the down-arrow key 92 of the remote controller 67 is pressed, the item described as "Name Input" for editing an input name is focused, as shown in FIG. 22, which corresponds to the forth drawing from the top on the left of FIG. 21.

Figure 23:
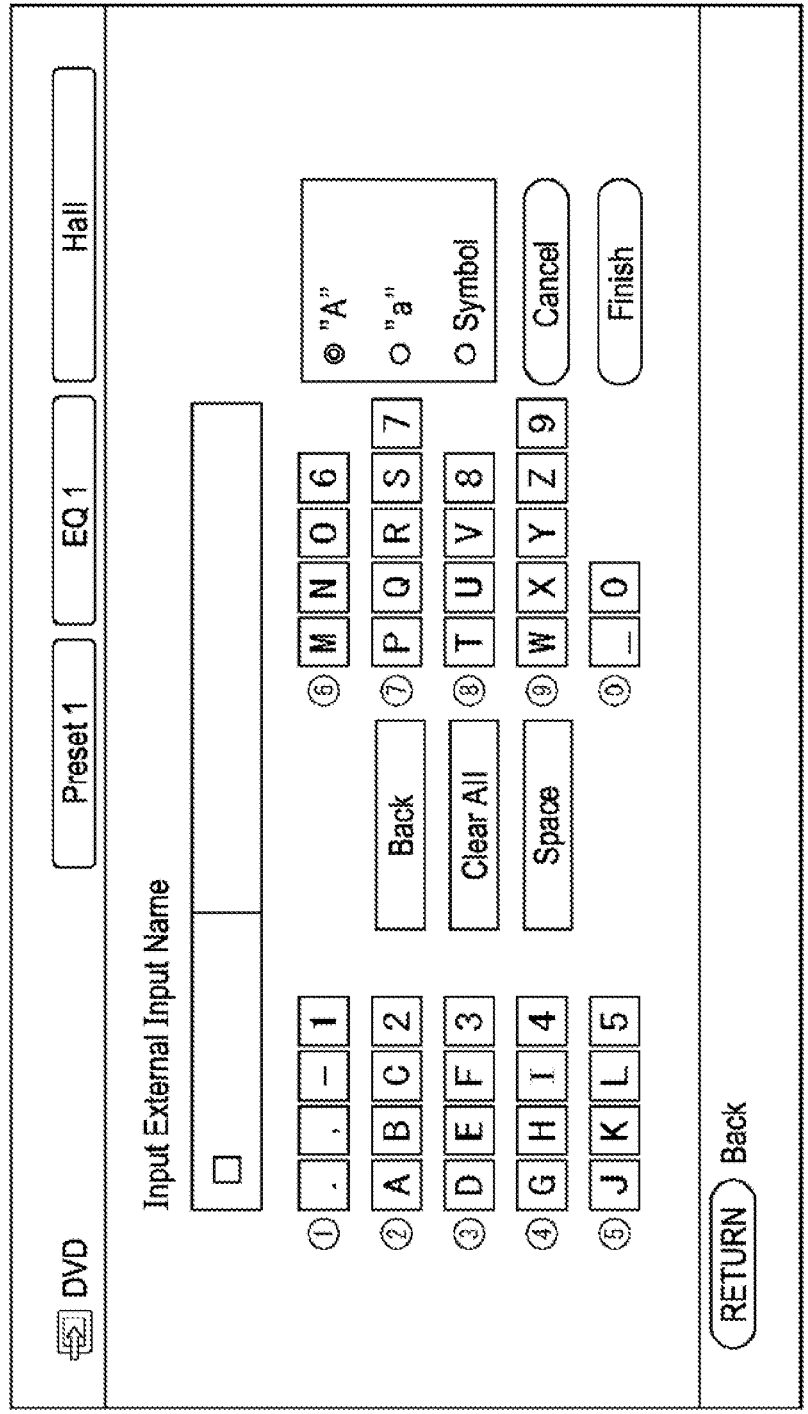
FIG. 23 is an illustration for explaining GUI images.

In the state in which the item for editing an input name among items of the option menu is focused, as shown in FIG. 22, when the select key 95 of the remote controller 67 is pressed, the screen showing the GUI images shown in FIG. 22 is changed to the screen showing the GUI images used for editing an input name for the item "DVD", as shown in FIG. 23 corresponding to the upper right drawing of FIG. 21.

Figure 24:
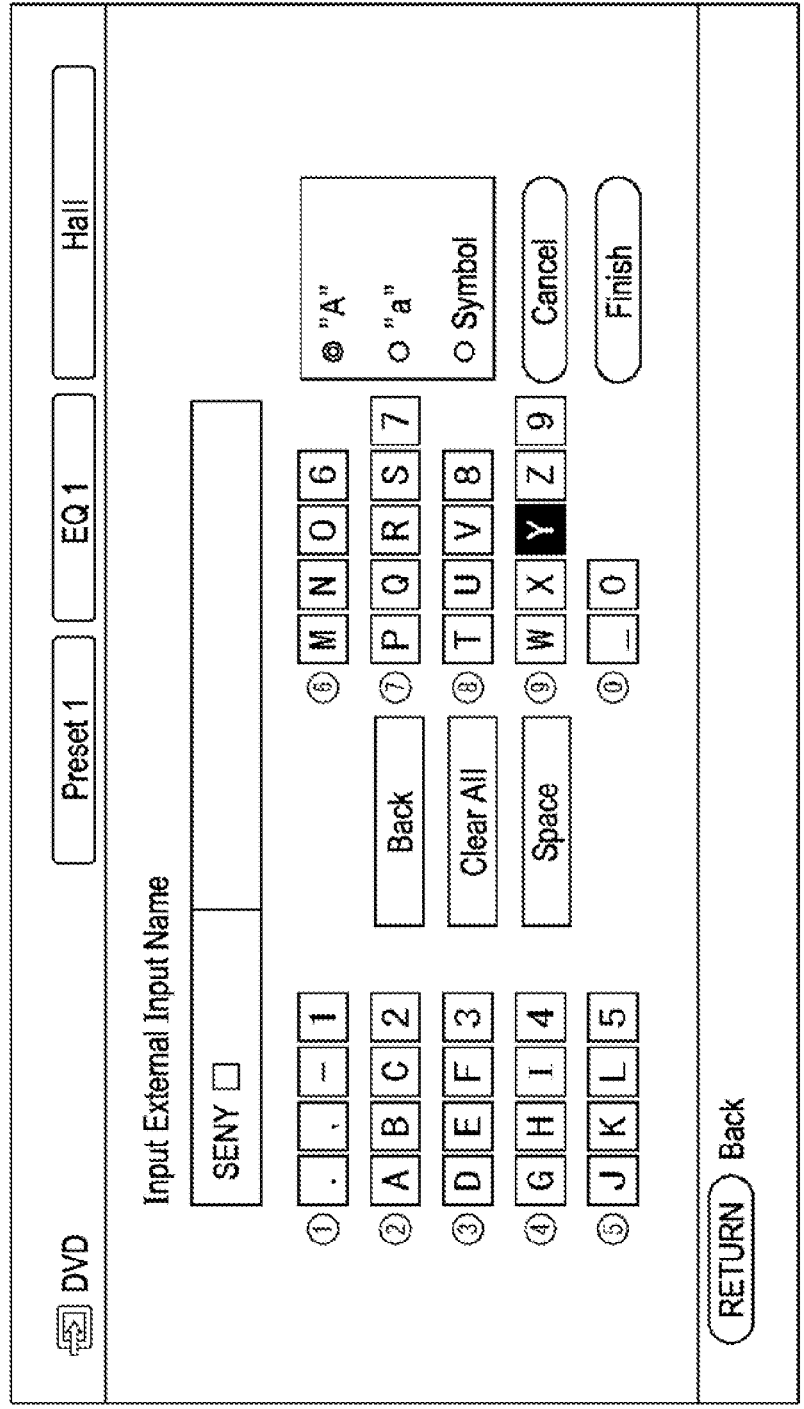
FIG. 24 is an illustration for explaining GUI images.

On the screen showing the GUI images used for editing an input name, a so-called software keyboard used for inputting characters and a field into which an input name is to be entered using the software keyboard are provided. When some of the keys 91 to 95 of the remote controller 67 are sequentially pressed and keys on the software keyboard, for example, an "S" key, an "E" key, an "N" key, and a "Y" key are sequentially focused and selected, "SENY" is set in the field into which an input name is entered, as shown in FIG. 24, which corresponds to the second drawing from the top on the right of FIG. 21. That is, the input name editing unit 104 edits the input name such that "DVD" is changed to "SENY".

Figure 25:
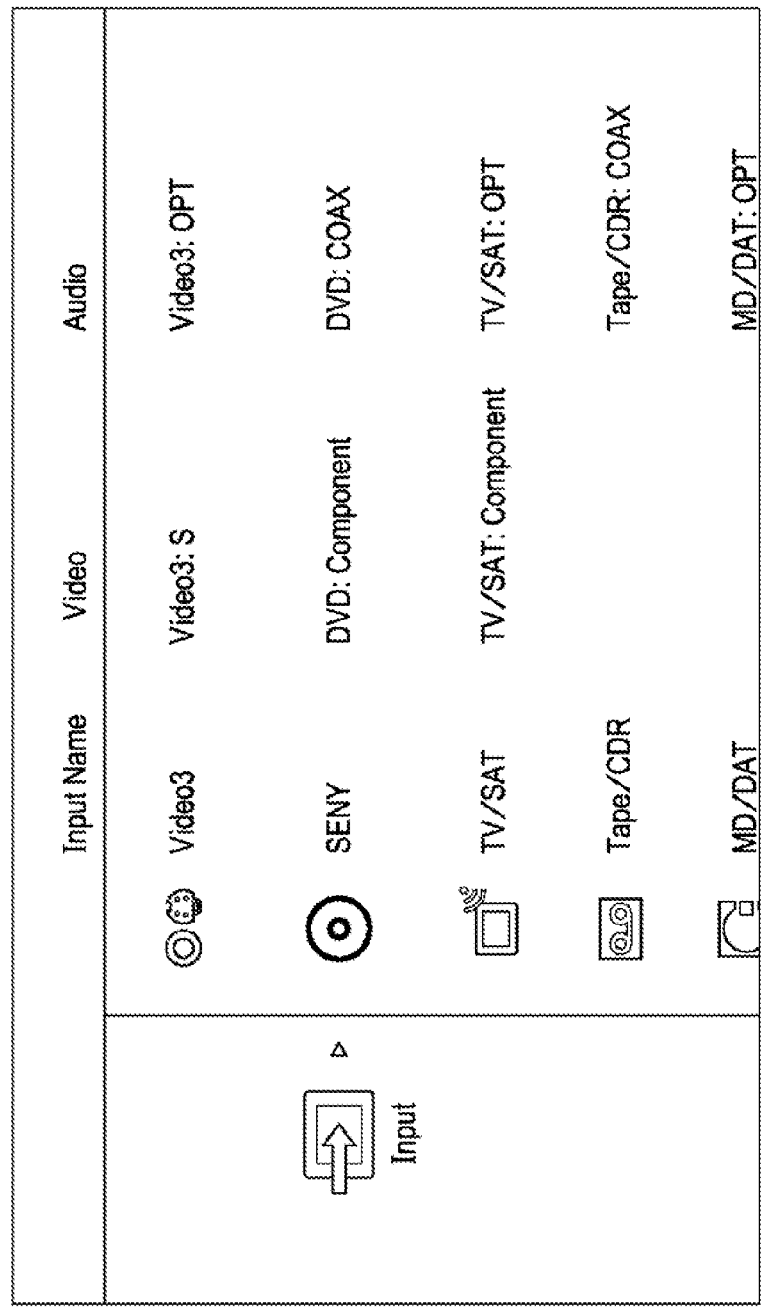
FIG. 25 is an illustration for explaining GUI images.

In this state, when a button named as "Finish" on the screen showing the GUI images is focused and the select key 95 of the remote controller 67 is pressed, the input name "DVD" is changed to "SENY", as shown in FIG. 25, which corresponds to the third drawing from the top on the right of FIG. 21. That is, the input name editing unit 104 sets the input name "SENY".

Accordingly, an input name can be easily edited and changed.

Figure 26:
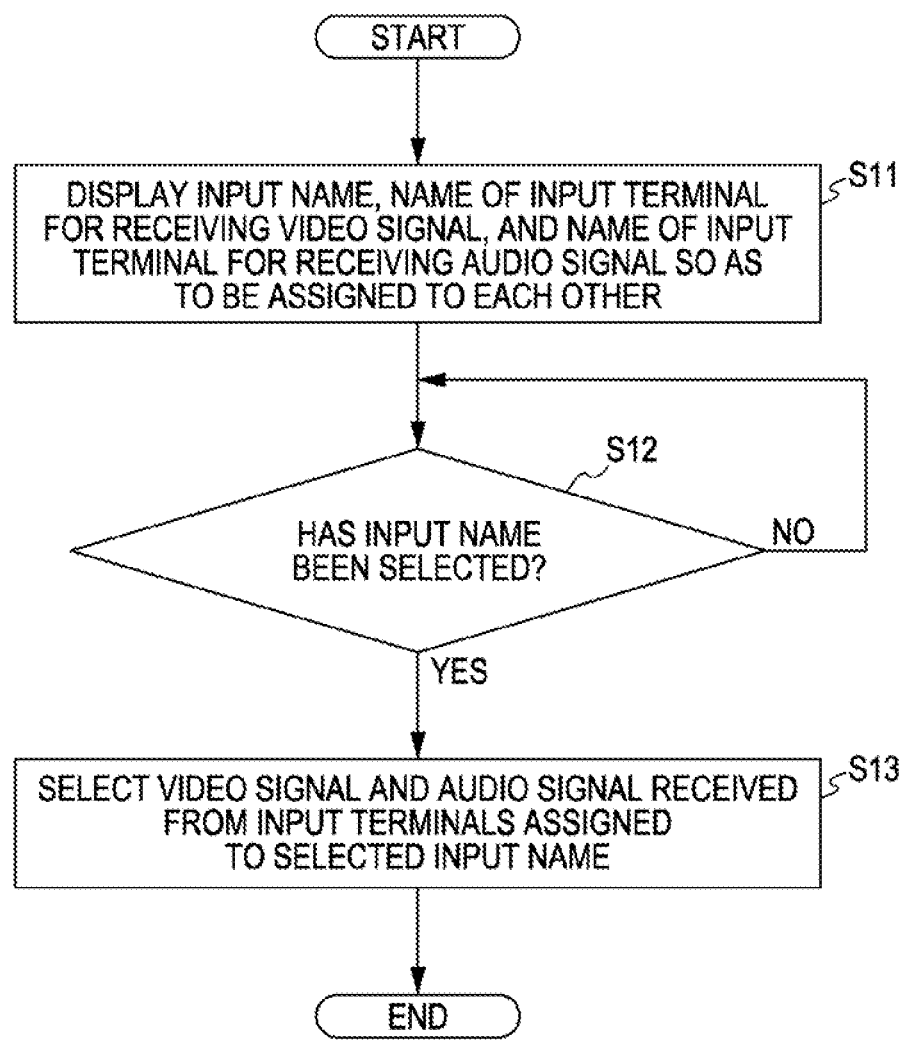
FIG. 26 is a flowchart of a process for selecting an input.

A process for selecting an input will be described with reference to FIG. 26. In step S11, the display controller 101 displays an input name representing a unit of an input to be selected by the user, the name of an input terminal that is assigned to the input name among input terminals for receiving video signals, and the name of an input terminal that is assigned to the input name among input terminals for receiving audio signals so as to be assigned to each other.

In step S12, the display controller 101 determines whether an input name has been selected. The display controller 101 repeats the determination processing of step S12 until it is determined that an input name has been selected.

If it is determined in step S12 that an input name has been selected, the process proceeds to step 13. In step S13, the selection controller 102 controls the selectors 22, 24, 26, 30, 32, and 34 to select a video signal and an audio signal that are received from input terminals assigned to the selected input name. Then, the process is terminated.

A process for assignment will be described with reference to a flowchart of FIG. 27. In step S31, the display controller 101 displays an input name representing a unit of an input to be selected by the user, the name of an input terminal that is assigned to the input name among input terminals for receiving video signals, and the name of an input terminal that is assigned to the input name among input terminals for receiving audio signals so as to be assigned to each other.

In step S32, the display controller 101 determines whether the option key 96 of the remote controller 67 is pressed and an item for input assign, that is, an item for assigning an input terminal to an input name is selected. The display controller 101 repeats the determination processing of step S32 until the option key 96 of the remote controller 67 is pressed and the item for assigning an input terminal to an input name is selected.

If it is determined in step S32 that the option key 96 of the remote controller 67 is pressed and the item for assigning an input terminal to an input name is selected, the process proceeds to step S33. In step S33, the assigning unit 103 selects an icon assigned to the selected input name in accordance with a user operation on the images displayed under the control of the display controller 101. In step S34, the assigning unit 103 selects an input terminal that is assigned to the selected input name and that receives a video signal in accordance with a user operation on the images displayed under the control of the display controller 101.

In step S35, the assigning unit 103 selects an input terminal that is assigned to the selected input name and that receives an audio signal in accordance with a user operation on the images displayed under the control of the display controller 101.

In step S36, the assigning unit 103 assigns the icon selected in step S33, the input terminal for receiving a video signal selected in step S34, and the input terminal for receiving an audio signal selected in step S35 to the selected input name. Then, the process is terminated. For example, the assigning unit 103 assigns an icon and input terminals to an input name by storing data indicating that the icon and the input terminals are assigned to the input name into the built-in ROM 63, the flash ROM 74, or the like.

Accordingly, an icon, an input terminal for receiving a video signal, and an input terminal for receiving an audio signal can be easily assigned to an input name.

FIG. 28 is a flowchart for explaining a process for editing an input name. In step S51, the display controller 101 displays an input name representing a unit of an input to be selected by a user, the name of an input terminal that is assigned to the input name among input terminals for receiving video signals, and the name of an input terminal that is assigned to the input name among input terminals for receiving audio signals so as to be assigned to each other.

In step S52, the display controller 101 determines whether the option key 96 of the remote controller 67 is pressed and an item for name input, that is, an item for editing an input name is selected. The display controller 101 repeats the determination processing of step S52 until the option key 96 of the remote controller 67 is pressed and the item for editing an input name is selected.

If it is determined in step S52 that the option key 96 of the remote controller 67 is pressed and the item for editing an input name is selected, the process proceeds to step S53. In step S53, the input name editing unit 104 edits the input name in accordance with a user operation on the images displayed under the control of the display controller 101.

In step S54, the input name editing unit 104 sets the edited input name. Then, the process is terminated. For example, the input name editing unit 104 sets the edited input name by storing data indicating the edited input name into the built-in ROM 63, the flash ROM 74, or the like.

Accordingly, irrespective of whether an input terminal receives an analog signal, a digital signal, a video signal, or an audio signal, assignment to all the input names can be achieved by regular operations for assigning "terminals" for both audio and video to an "input".

In addition, since the list of assignment of input terminals for receiving video signals and input terminals for receiving audio signals to input names can be displayed on the screen that is usually used by the user for selecting an input, that is, on the Input Selection screen. Thus, the advantages described below can be expected.

First, regarding assignment of an input terminal for receiving an audio signal, in an AV amplifier of the related art, an input terminal for receiving an analog audio signal is not "assigned by a user". In addition, the AV amplifier of the related art requests the user to perform an indirect operation in which "when assignment of one or more input terminals for receiving digital audio signals is not performed, an input terminal for receiving an analog audio signal is automatically selected". Thus, it is necessary for the user to determine "whether a digital signal or an analog signal is received" and "which digital terminal is to be used when a digital signal is received" during setting and viewing/listening. In contrast, in the AV amplifier 11, an input terminal for receiving a digital audio signal and an input terminal for receiving an analog audio signal are displayed in parallel on a GUI screen. Thus, selection of input terminals can be performed in a consistent manner. In addition, an existing complicated concept can be replaced with a simple concept such as "performing assignment of a terminal among provided terminals".

For assignment of an input terminal for receiving a video signal, an item for "not performing selection (that is, only receiving sound)" is provided, unlike an item for input terminal for receiving an audio signal.

In the related art, since information indicating that "no video terminal is assigned to a selected input" is not clearly specified, determination that no video terminal is assigned to the selected input is made on the basis of an input name (for example, "CD" or the like). However, in the AV amplifier 11, a list of the name of an input terminal for receiving a video signal and the name of an input terminal for receiving an audio signal that are assigned to an input name is displayed when the input name is selected. Thus, the user is able to easily know whether assignment of an input terminal for receiving a video signal is performed or not.

An input name can be intuitively perceived as "a pattern of combination of an input terminal for receiving a video signal and an input terminal for receiving an audio signal". Thus, by redundantly assigning an input terminal to a plurality of input names, the number of input names can be easily increased artificially compared with the number of input terminals.

In order to effectively use a limited number of input terminals for receiving audio signals, an "Input Mode" function of dynamically switching audio inputs has been provided so that the user can artificially increase the number of patterns of input selection. However, as described above, such a function is not necessary for the AV amplifier 11 since the number of input names is artificially increased compared with the number of input terminals by redundantly assigning an input terminal to a plurality of input names. Thus, the configuration of the AV amplifier 11 can be more simplified.

In contrast, for a user who desires to assign only a limited small number of input terminals to an input name since the number of devices to be connected to the AV amplifier 11 is small, the number of steps of operations for input selection (that is, the number of scroll times and the time used for scrolling) can be reduced to the minimum necessary by further reducing the number of input names displayed on the Input Selection screen. Thus, a more user-friendly input selection interface can be provided.

Although assigning of an input terminal for receiving an analog or digital audio signal to an input and assigning of an input terminal for receiving a video signal to the input have been performed by individual interfaces, the AV amplifier 11 is capable of achieving the assigning operations by a single interface.

Normally, the AV amplifier 11 seamlessly displays on GUI an interface screen for "input selection" used by a user and interface screens for "input setting" and for "checking for an input setting state", which have been incorporated in a complicated menu structure. Thus, assigning operations of an AV amplifier, which have been regarded as complicated, can be performed simply, that is, can be achieved readily and easily.

By using a common interface, the amount of GUI resources, such as the size of a control program and the number of pieces of bitmap data for display, can be reduced.

When a menu is displayed as described above, the user is able to perform an operation using the menu. The display of the menu is controlled such that an input name, which is an item of the menu and represents a unit of an input to be selected by the user, the name of a first terminal that is assigned to the input name and that receives a video signal, and the name of a second terminal that is assigned to the input name and that receives an audio signal are displayed so as to be assigned to each other. When the user selects the input name as the item of the menu, the video signal received from the first terminal and the audio signal received from the second terminal are selected. Thus, an input can be selected more easily and more simply using less resources.

Although the AV amplifier 11 has been described as an embodiment of the present invention, the present invention is not necessarily limited to the AV amplifier 11. An embodiment of the present invention is applicable to an apparatus that performs predetermined processing using a menu, such as a television receiver, a video recorder, or an audio recorder.

The above-described series of processing may be performed by hardware or software. If the above-described series of processing is performed by software, a program constituting the software is installed from a program recording medium into a computer built in dedicated hardware or, for example, a general-purpose personal computer capable of performing various functions with various programs installed thereon.

FIG. 29 is a block diagram showing an example of the configuration of a personal computer that performs the above-described series of processing by a program. A central processing unit (CPU) 201 performs various types of processing in accordance with a program stored in a ROM 202 or a storage unit 208. A program to be performed by the CPU 201, data, and the like are stored in the RAM 203. The CPU 201, the ROM 202, and the RAM 203 are connected to each other via a bus 204.

An input/output interface 205 is connected to the CPU 201 through the bus 204. An input unit 206 including a keyboard, a mouse, a microphone, and the like and an output unit 207 including a display, a speaker, and the like are connected to the input/output interface 205. The CPU 201 performs various types of processing in accordance with instructions input by the input unit 206. The CPU 201 outputs a processing result to the output unit 207.

A storage unit 208 connected to the input/output interface 205 includes, for example, a hard disk. The storage unit 208 stores a program to be performed by the CPU 201 and various data. A communication unit 209 communicates with an external apparatus via a network, such as the Internet or a local area network.

A program may be acquired through the communication unit 209 and stored in the storage unit 208.

When a removable medium 211, such as a magnetic disk, an optical disk, a magneto-optical disk, or a semiconductor memory, is installed in a drive 210 connected to the input/output interface 205, the drive 210 drives the removable medium 211 and acquires a program and data recorded in the removable medium 211. The acquired program and data are transferred to and stored in the storage medium 208 when necessary.

A program recording medium that is installed on a computer and that stores a program executable by the computer includes the removable medium 211, which is a package medium, such as a magnetic disk (e.g., a flexible disk), an optical disk (e.g., a compact disc read-only memory (CD-ROM) or a digital versatile disc (DVD)), a magneto-optical disk, or a semiconductor memory, the ROM 202 in which a program is temporarily or permanently stored, and the hard disk forming the storage unit 208, as shown in FIG. 29. A program is stored into the program recording medium using a wired or wireless communication medium, such as a local area network, the Internet, or digital satellite broadcasting, via the communication unit 209, which is an interface, such as a router or a modem, where appropriate.

In this specification, steps defining a program stored in the program recording medium are not necessarily performed in time series in accordance with the written order. The steps may be performed in parallel or independently without being performed in time series.

In addition, in this specification, the term "system" represents the entire equipment constituted by a plurality of apparatuses.

An embodiment of the present invention is not limited to any of the above-described embodiments, and various changes and modifications can be made to the present invention without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An audio/visual amplifier for processing video signals and audio signals, comprising:
    display control means for controlling display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other;
    selecting means for, when the user selects only the input name as the item of the menu, automatically selecting the video signal received from the first terminal and the audio signal received from the second terminal according to a database storing assignments between input names and terminals that receive video and audio signals; and
    assigning means for assigning the first terminal that receives the video signal and the second terminal that receives the audio signal to the input name, wherein the assigning means generates another menu that identifies a plurality of terminals for receiving the video signal that are assignable to the input name and that identifies a plurality of terminals for receiving the audio signal that are assignable to the input name independently of the plurality of the first terminals for receiving the video signal, and assigns the first terminal that receives the video signal and the second terminal that receives the audio signal to the input name in response to selections made on the another menu.

2. The audio/visual amplifier according to claim 1, wherein the display control means controls the display of the menu such that a predetermined icon assigned to the input name is displayed so as to be assigned to the input name.

3. The audio/visual amplifier according to claim 1, wherein the assigning means further assigns a predetermined icon to the input name.

4. The audio/visual amplifier according to claim 1, further comprising editing means for editing the input name.

5. A selection method for use in an audio/visual amplifier for processing video signals and audio signals and for selecting a video signal and an audio signal to be processed, comprising the steps of:
    controlling display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other;
    automatically selecting, when the user selects only the input name as the item of the menu, the video signal received from the first terminal and the audio signal received from the second terminal according to a database storing assignments between input names and terminals that receive video and audio signals; and
    assigning the first terminal that receives the video signal and the second terminal that receives the audio signal to the input name, wherein the assigning includes generating another menu that identifies a plurality of terminals for receiving the video signal that are assignable to the input name and that identifies a plurality of terminals for receiving the audio signal that are assignable to the input name independently of the plurality of the first terminals for receiving the video signal, and assigning the first terminal that receives the video signal and the second terminal that receives the audio signal to the input name in response to selections made on the another menu.

6. A non-transitory recording medium on which a computer-readable program for causing an audio/visual amplifier for processing video signals and audio signals to perform selection control processing for controlling selection of a video signal and an audio signal to be processed is recorded, the selection control processing comprising the steps of:
    controlling display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other;

controlling, when the user selects only the input name as the item of the menu, selection of the video signal and the audio signal such that the video signal received from the first terminal and the audio signal received from the second terminal are automatically selected according to a database storing assignments between input names and terminals that receive video and audio signals; and assigning the first terminal that receives the video signal and the second terminal that receives the audio signal to the input name, wherein the assigning includes generating another menu that identifies a plurality of terminals for receiving the video signal that are assignable to the input name and that identifies a plurality of terminals for receiving the audio signal that are assignable to the input name independently of the plurality of the first terminals for receiving the video signal, and assigning the first terminal that receives the video signal and the second terminal that receives the audio signal to the input name in response to selections made on the another menu.

7. An audio/visual amplifier for processing video signals and audio signals, comprising:

a display controller operable to control display of a menu such that an input name, which is an item of the menu and represents a unit of an input to be selected by a user, a name of a first terminal that is assigned to the input name and that receives a video signal, and a name of a second terminal that is assigned to the input name and that receives an audio signal are displayed so as to be assigned to each other;

a selector operable to, when the user selects only the input name as the item of the menu, automatically select the video signal received from the first terminal and the audio signal received from the second terminal according to a database storing assignments between input names and terminals that receive video and audio signals; and an assigning unit that assigns the first terminal that receives the video signal and the second terminal that receives the audio signal to the input name, wherein the assigning unit generates another menu that identifies a plurality of terminals for receiving the video signal that are assignable to the input name and that identifies a plurality of terminals for receiving the audio signal that are assignable to the input name independently of the plurality of the first terminals for receiving the video signal, and assigns the first terminal that receives the video signal and the second terminal that receives the audio signal to the input name in response to selections made on the another menu.

8. The audio/visual amplifier according to claim 4, wherein the editing means further generates a graphical user interface of a keyboard, and the editing means edits the input name based on inputs received through the keyboard.

\* \* \* \* \*